(12) United States Patent
Nishimura et al.

(10) Patent No.: US 12,043,215 B2
(45) Date of Patent: Jul. 23, 2024

(54) VEHICLE ARTICLE STORAGE STRUCTURE

(71) Applicants: Nissan Motor Co., Ltd., Kanagawa (JP); Marelli Corporation, Saitama (JP)

(72) Inventors: Takeshi Nishimura, Kanagawa (JP); Shota Watase, Kanagawa (JP); Tomohiro Watanabe, Saitama (JP); Masato Abe, Saitama (JP); Masami Kikuchi, Saitama (JP)

(73) Assignees: Nissan Motor Co., Ltd., Kanagawa (JP); Marelli Corporation, Saitama (JP)

( * ) Notice: Subject to any disclaimer, the term of this patent is extended or adjusted under 35 U.S.C. 154(b) by 0 days.

(21) Appl. No.: 17/754,747

(22) PCT Filed: Oct. 7, 2020

(86) PCT No.: PCT/JP2020/037947
§ 371 (c)(1),
(2) Date: Apr. 11, 2022

(87) PCT Pub. No.: WO2021/070845
PCT Pub. Date: Apr. 15, 2021

(65) Prior Publication Data
US 2024/0083364 A1    Mar. 14, 2024

(30) Foreign Application Priority Data

Oct. 11, 2019 (JP) ................................ 2019-187720

(51) Int. Cl.
*B60R 7/06* (2006.01)

(52) U.S. Cl.
CPC ..................................... *B60R 7/06* (2013.01)

(58) Field of Classification Search
CPC ......................................................... B60R 7/06
(Continued)

(56) References Cited

U.S. PATENT DOCUMENTS 2,522,602 A * 9/1950 Burns .................... B60N 3/002
108/45
2,592,032 A * 4/1952 Henderson ............ B60N 3/002
108/45

(Continued)

FOREIGN PATENT DOCUMENTS

CN       205523999 U    8/2016
DE    202016103399 U1    7/2016

(Continued)

*Primary Examiner* — Pinel E Romain
(74) *Attorney, Agent, or Firm* — Osha Bergman Watanabe & Burton LLP

(57) ABSTRACT

A vehicle article storage structure includes an article storage box (13) provided with an opening (33a) on the upper side for getting articles in and out, a housing unit (15) provided on the lower side of an instrument panel (3) to house the article storage box (13), and links (35, 37, and 39) configured to movably support the article storage box (13) along a range from a housed position at which the article storage box (13) is housed in the housing unit (15) to a drawn position at which the article storage box (13) is drawn in a vehicle compartment rearward direction from the housed position via an intermediate position at which the article storage box (13) is located between the housed position and the drawn position, the intermediate position being located below the housed position and the drawn position.

9 Claims, 18 Drawing Sheets

(58) Field of Classification Search
USPC .......................................................... 296/37.8
See application file for complete search history.

(56) References Cited

U.S. PATENT DOCUMENTS

| | | | | |
|---|---|---|---|---|
| 2,657,967 | A * | 11/1953 | Gilchrest | B60R 7/06 |
| | | | | 312/246 |
| 2,845,315 | A * | 7/1958 | Mccoy | B60N 3/002 |
| | | | | 108/45 |
| 2,860,021 | A * | 11/1958 | Steele | B60N 3/002 |
| | | | | 108/45 |
| 3,406,999 | A * | 10/1968 | Kozicki | B60P 3/36 |
| | | | | 296/156 |
| 2,430,049 | A * | 11/1974 | Flory | B60N 3/007 |
| | | | | 108/46 |
| 4,630,857 | A | 12/1986 | Zweiniger et al. | |
| 4,852,932 | A | 8/1989 | Komeya et al. | |
| 5,817,399 | A * | 10/1998 | Kalman | E04F 11/16 |
| | | | | 427/372.2 |
| 10,661,719 | B2 * | 5/2020 | McCarthy | B60N 3/08 |
| 10,673,170 | B2 * | 6/2020 | Hopfen | H01R 13/4536 |
| 2002/0084666 | A1* | 7/2002 | Toppani | B60R 7/06 |
| | | | | 296/37.12 |
| 2006/0283668 | A1 | 12/2006 | Ogura | |
| 2007/0176455 | A1* | 8/2007 | Kataoka | B60R 5/02 |
| | | | | 296/70 |
| 2009/0295183 | A1* | 12/2009 | Piekny | B60R 7/06 |
| | | | | 224/539 |
| 2012/0049558 | A1* | 3/2012 | Souillac | B60R 11/00 |
| | | | | 296/37.12 |
| 2012/0250878 | A1* | 10/2012 | Ito | H04B 1/082 |
| | | | | 381/86 |
| 2016/0297368 | A1 | 10/2016 | Huebner et al. | |
| 2023/0192002 | A1* | 6/2023 | Boinais | B60R 7/04 |
| | | | | 296/37.8 |

FOREIGN PATENT DOCUMENTS

| | | |
|---|---|---|
| JP | S59025699 B2 | 6/1984 |
| JP | S61139538 A | 6/1986 |
| JP | S6379235 U | 5/1988 |
| JP | H03105563 U | 10/1991 |
| JP | H04100941 U | 9/1992 |
| JP | H05085271 A | 4/1993 |
| JP | H09309367 A | 12/1997 |
| JP | H11268588 A | 10/1999 |
| JP | 2005096523 A | 4/2005 |
| JP | 2006349146 A | 12/2006 |
| JP | 5009217 B2 | 8/2012 |

* cited by examiner

VEHICLE ARTICLE STORAGE STRUCTURE

TECHNICAL FIELD

The present invention relates to a vehicle article storage structure.

BACKGROUND ART

A storage holder serving as a vehicle glove compartment is known (refer to Patent Literature 1). The storage holder includes a lid member that opens/closes an opening provided on the upper side of a body member of the storage holder. The body member is provided with a cover member that can be attached on the outside of an inner wall (an outer wall) and side walls of the body member. The lid member is inserted between the cover member and the inner wall when the opening is exposed.

CITATION LIST

Patent Literature

Patent Literature 1: Japanese Patent No. 5009217

SUMMARY OF INVENTION

The storage holder disclosed in Patent Literature 1 is arranged in the center console located between the driver's seat and the passenger's seat of the vehicle. The storage holder is thus easy to use by the occupant in either the driver's seat or the passenger's seat. The vehicle glove compartment when built into the instrument panel, however, may be inconvenient for getting articles in and out, since the occupant needs to stretch the arm toward the front side from the driver's seat or the passenger's seat.

In view of the above problem, an object of the present invention is to facilitate an operation of getting articles in and out of an article storage unit built in an instrument panel.

Solution to Problem

A vehicle article storage structure according to an aspect of the present invention include at least one link configured to movably support an article storage unit along a range from a housed position at which the article storage unit is housed in a housing unit provided on a lower side of an instrument panel to a drawn position at which the article storage unit is drawn in a vehicle compartment rearward direction from the housed position via an intermediate position at which the article storage unit is located between the housed position and the drawn position, the intermediate position being located below the housed position and the drawn position.

Advantageous Effects

The present invention can facilitate the operation of getting articles in and out of the article storage unit built in the instrument panel.

DESCRIPTION OF EMBODIMENTS

Some embodiments will be described below with reference to the drawings. The word "front" including the words such as "forward" and "front side" as used herein refers to a forward side of the vehicle, and the word "rear" including the words such as "rearward" and "rear side" as used herein refers to a rearward side of the vehicle. The right-left direction as used herein refers to a vehicle width direction.

First Embodiment

Figure 1:
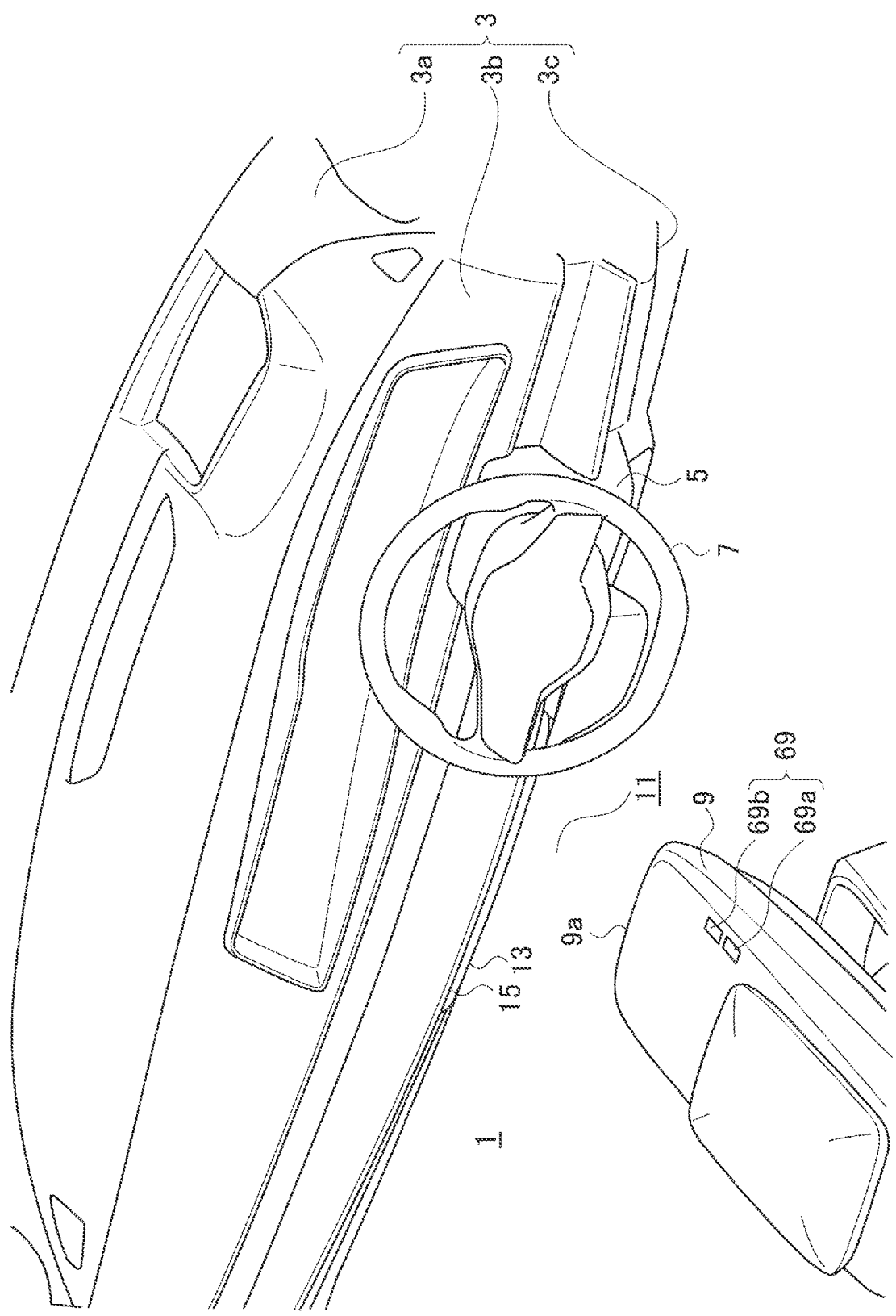
FIG. 1 is a perspective view illustrating a compartment of a vehicle in a state in which an article storage box in a vehicle article storage structure according to a first embodiment is located at a housed position.
Figure 2:
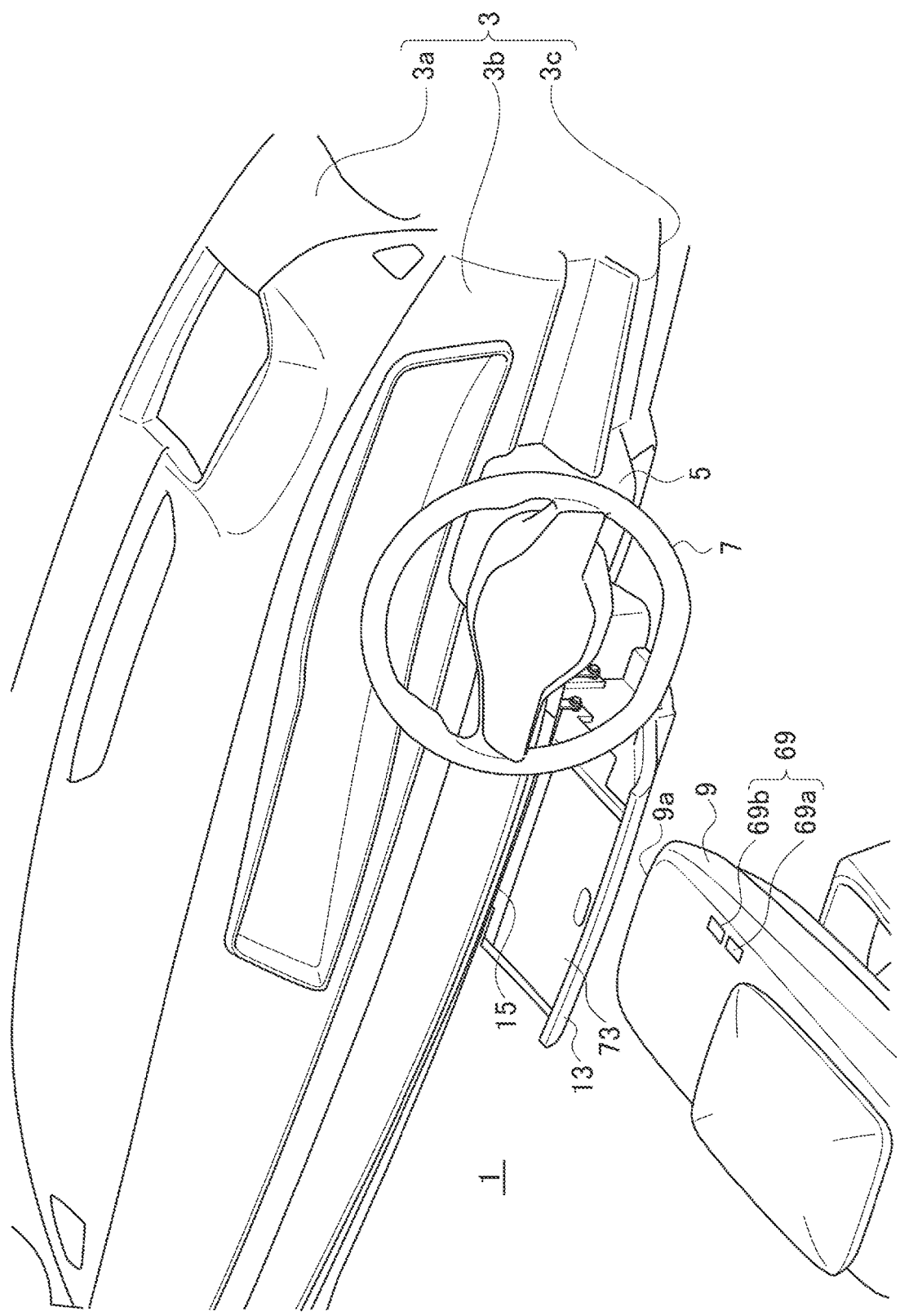
FIG. 2 is a perspective view when the article storage box is shifted to an intermediate position from the state illustrated in FIG. 1.
Figure 3:
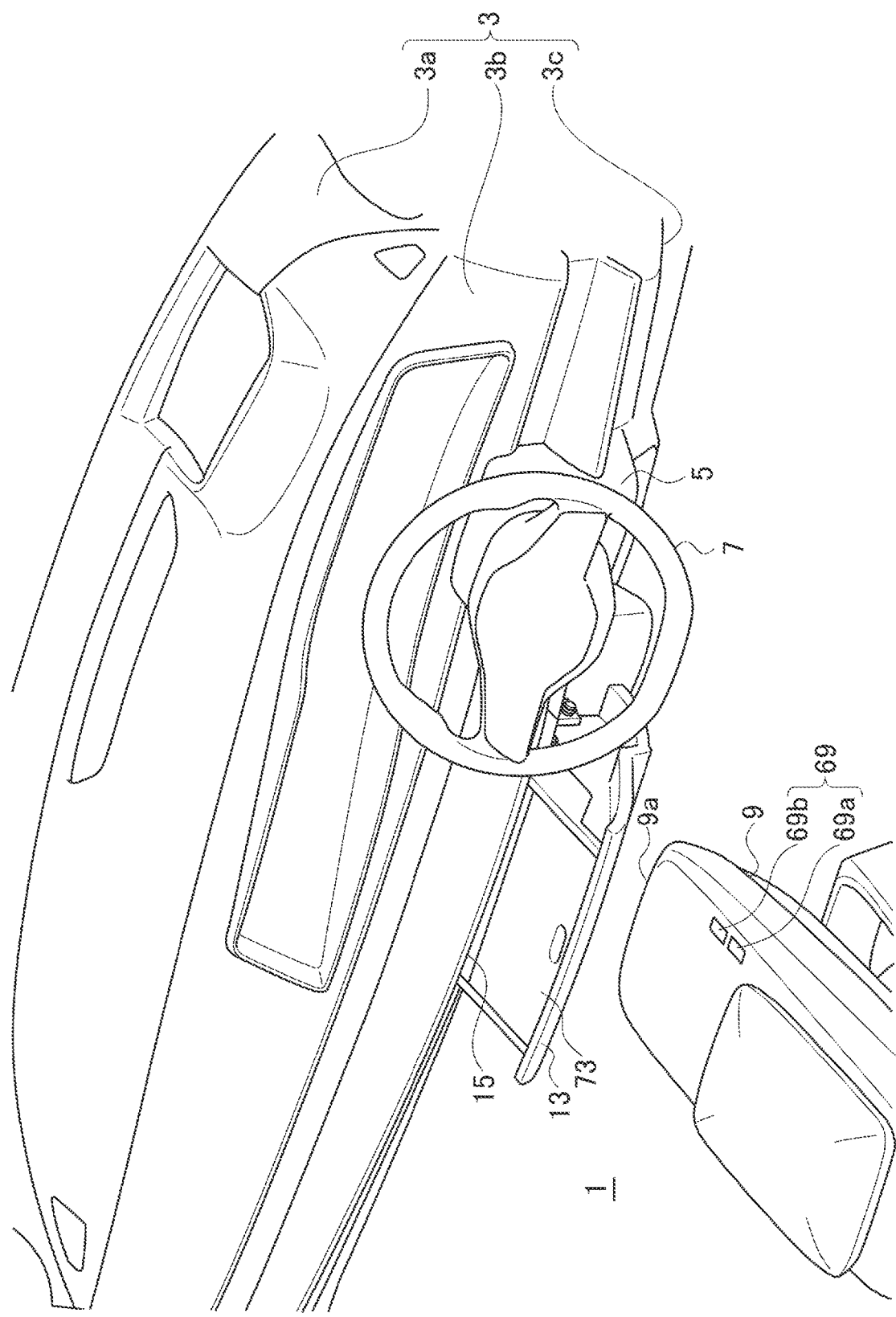
FIG. 3 is a perspective view when the article storage box is shifted to a drawn position from the state illustrated in FIG. 2.

FIG. 1 to FIG. 3 each illustrate a compartment of a vehicle equipped with a vehicle article storage structure according to the present embodiment. An instrument panel 3 is provided on the front side of the compartment 1. A steering column 5 is provided at a lower part of the instrument panel 3 on the right side in the vehicle width direction. The steering column 5 rotatably supports a steering wheel 7. A center console 9 is installed behind the instrument panel 3 in the middle in the vehicle width direction. A front edge 9a of the center console 9 is located away from the instrument panel 3 so as to provide a space 11 between the center console 9 and the instrument panel 3.

The instrument panel 3 includes an upper surface part 3a extending substantially horizontally from a lower edge of the windshield (not illustrated) toward the rear side. An upper inclined part 3b extends rearward in the diagonally lower direction from the edge on the rear side of the upper surface part 3a. A lower inclined part 3c extend forward in the diagonally lower direction from the lower edge of the upper inclined part 3b.

An article storage box 13 serving as an article storage unit is installed at the lower inclined part 3c of the instrument panel 3 in the middle in the vehicle width direction. A housing unit 15 for housing the article storage box 13 is built in the lower inclined part 3c of the instrument panel 3 in the middle in the vehicle width direction. The housing unit 15 is attached to a steering member (not illustrated) with a fixing tool. The steering member extends in the vehicle width direction, and is provided with the steering column 5 attached thereto.

FIG. 1 illustrates a state, referred to below as a "housed position", in which the article storage box 13 is housed in the housing unit 15. FIG. 2 illustrates a state, referred to below as an "intermediate position", in which the article storage box 13 is being drawn rearward from the "housed position" illustrated in FIG. 1. FIG. 3 illustrates a state, referred to below as a "drawn position", in which the article storage box 13 is further drawn rearward from the "intermediate position" illustrated in FIG. 2. The "intermediate position" of the article storage box 13 corresponds to the substantially middle position between the "housed position" and the "drawn position".

Figure 4:
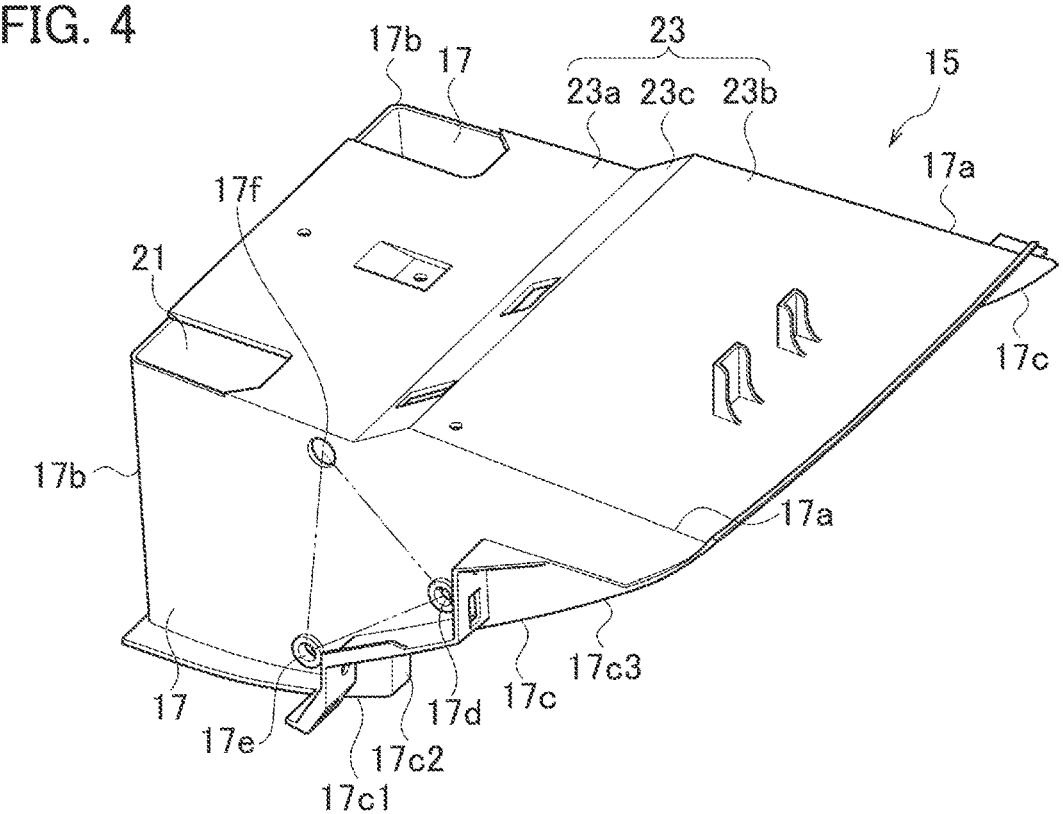
FIG. 4 is a perspective view illustrating a housing unit for housing the article storage box according to the first embodiment.

The housing unit 15 includes a pair of housing side walls 17 located on both sides in the vehicle width direction, a housing front wall 21 located on the front side, and a housing upper wall 23 located on the upper side, as illustrated in FIG. 4, and is open on the lower and rear sides. The housing side walls 17 each include an upper edge 17a substantially horizontally located at the upper part, a vertical edge 17b located on the front side and extending in the upper-lower direction, and a curved edge 17c connecting the rear end of the upper edge 17a and the lower end of the vertical edge 17b so as to have a curved shape. The curved edge 17c includes a curved edge front part 17c1, a bent part 17c2 bent upward from the rear end of the curved edge front part 17c1, and a curved edge rear part 17c3 connected to the rear side of the bent part 17c2.

The housing front wall 21 is formed to have a rectangular shape longer in the right-left direction as viewed in the vehicle front-rear direction. The housing upper wall 23 is formed to have a rectangular shape longer in the vehicle front-rear direction as viewed in the upper-lower direction, and is provided with a step 23c substantially in the middle in the vehicle front-rear direction so that an upper wall front part 23a is located at a lower level than an upper wall rear part 23b.

The article storage box 13 includes a pair of box side walls 25 located on both sides in the vehicle width direction, a box front wall 29 located on the front side, and a box lower wall 31 located on the rear and lower sides. The article storage box 13 has an article storage space 33 for storing articles defined by the right and left box side walls 25, the box front wall 29, and the box lower wall 31. An opening 33a serving as an article inlet/outlet is provided on the upper side of the article storage space 33.

The box side walls 25 each include a notched recess 25u having a substantially V-shape recessed downward from the upper edge adjacent to the box front wall 29. The box side walls 25 have substantially the same structure as the housing side walls 17 as viewed in the right-left direction, instead of including the notched recesses 25u, and are entirely located adjacent to and on the inner side of the housing side walls 17 when located at the "housed position". The box front wall 29 has substantially the same structure as the housing front wall 21 as viewed in the vehicle front-rear direction, and is located adjacent to the housing front wall 21 when located at the "housed position".

The box lower wall 31 is formed to have a curved shape covering a part of the housing unit 15 open on the lower and rear sides when located at the "housed position". The box lower wall 31 includes projecting lower walls 31a projecting outward on both sides in the right-left direction from the respective box side walls 25. The box lower wall 31 further includes bent parts 31c bent upward from the respective rear ends of lower wall front parts 31b, and lower wall rear parts 31d extending rearward from the bent parts 31c.

Figure 6A:
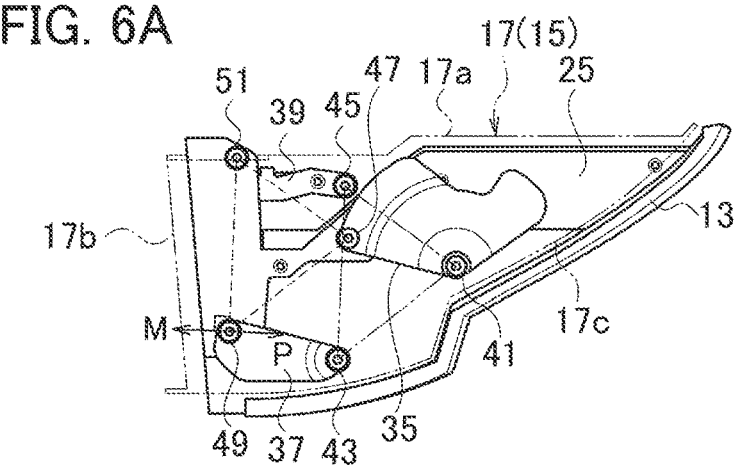
FIG. 6A is a side view illustrating positions of links when the article storage box according to the first embodiment is located at the housed position.
Figure 6B:
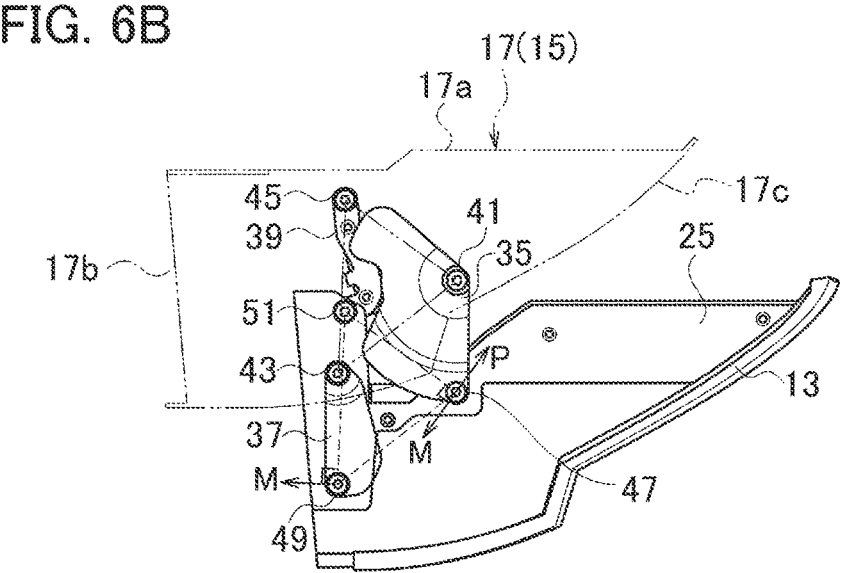
FIG. 6B is a side view illustrating the positions of the links when the article storage box according to the first embodiment is located at the intermediate position.
Figure 6C:
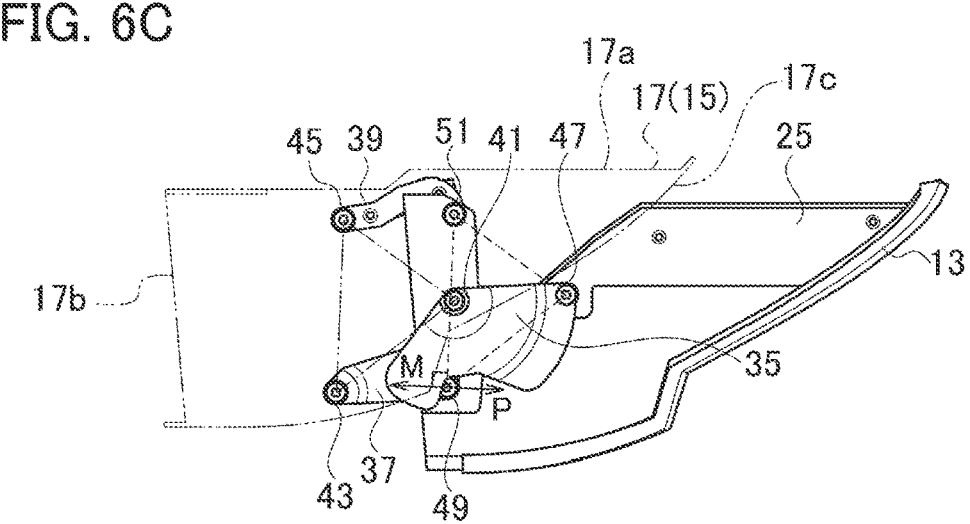
FIG. 6C is a side view illustrating the positions of the links when the article storage box according to the first embodiment is located at the drawn position.

The movement of the article storage box 13 between the "housed position" including the "intermediate position" and the "drawn position" is made by a link mechanism. FIG. 6A, FIG. 6B, and FIG. 6C illustrate a moving state of the link mechanism at each of the "housed position", the "intermediate position", and the "drawn position". FIG. 6A, FIG. 6B, and FIG. 6C each indicate the position of the housing side wall 17 by the dash and double-dotted line. The link mechanism includes a first link 35, a second link 37, and a third link 39. The first link 35 and the second link 37 are located between the inner surface of the housing side wall 17 and the outer surface of the box side wall 25. The third link 39 is located on the inner side of the box side wall 25. A pair of the link mechanisms are provided on both right and left sides each including the three links 35, 37, and 39.

As illustrated in FIG. 4, the housing side walls 17 are each provided with a first link connection hole 17d, a second link connection hole 17*e*, and a third link connection hole 17*f*. The first link connection hole 17*d* is located at a position close to the bent part 17*c*2 adjacent to the curved edge rear part 17*c*3. The second link connection hole 17*c* is located adjacent to the cured edge front part 17*c*1 and substantially in the middle of the cured edge front part 17*c*1 in the front-rear direction. The third link connection hole 17*f* is located close to the step 23*c* and adjacent to the upper wall front part 23*a*.

FIG. 4, FIG. 6A, FIG. 6B, and FIG. 6C each indicate a triangle defined by the three positions of the first link connection hole 17*d*, the second link connection hole 17*e*, and the third link connection hole 17*f* connected to each other by the dashed and double-dotted lines. A first link fixed-side connection shaft 41 serving as a connection part of the first link 35 on the housing unit side is attached to the first link connection hole 17*d*. A second link fixed-side connection shaft 43 serving as a connection part of the second link 37 on the housing unit side is attached to the second link connection hole 17*e*. A third link fixed-side connection shaft 45 serving as a connection part of the third link 39 on the housing unit side is attached to the third link connection hole 17*f*. The virtual lines connecting the three connection parts of the three links 35, 37, and 39 on the housing unit 15 side thus form the triangle as viewed in the vehicle width direction.

Figure 5:
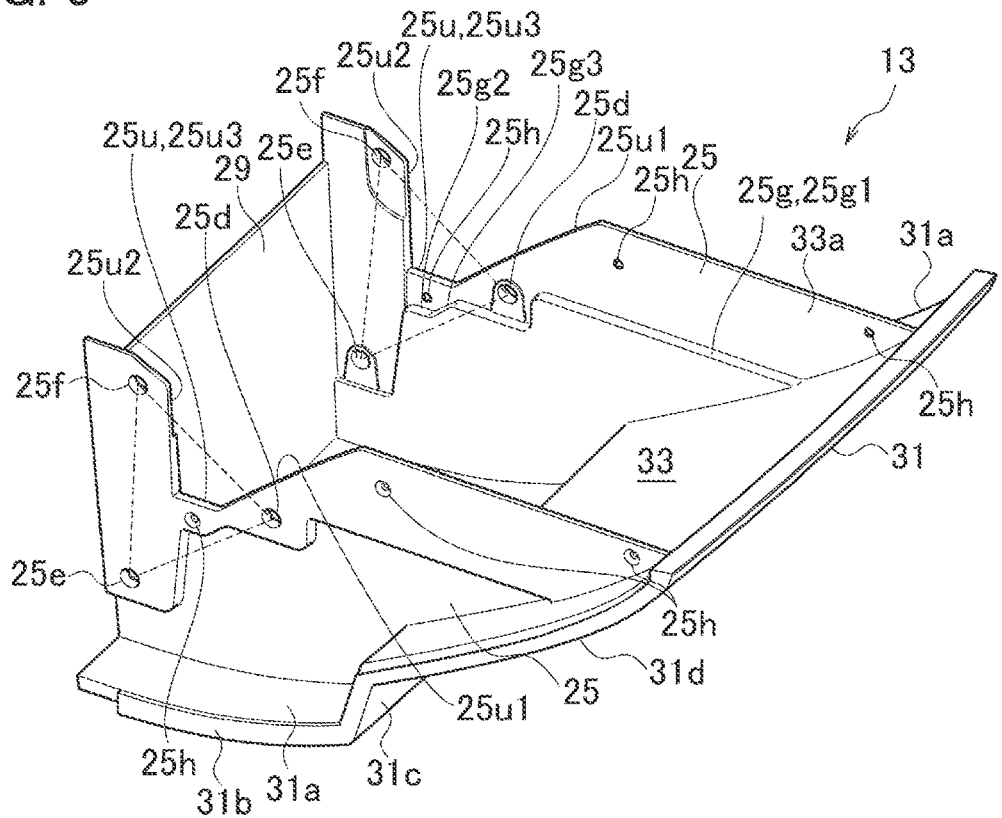
FIG. 5 is a perspective view illustrating the article storage box according to the first embodiment.

As illustrated in FIG. 5, the box side walls 25 are each provided with a first link connection hole 25*d*, a second link connection hole 25*e*, and a third link connection hole 25*f*. The first link connection hole 25*d* is located substantially in the middle at a position adjacent to an inclined part 25*u*1 on the rear side of the notched recess 25*u*. The second link connection hole 25*e* is located adjacent to the box front wall 29 and adjacent to the box lower wall 31. The third link connection hole 25*f* is located at the upper end adjacent to a vertical part 25*u*2 on the front side of the notched recess 25*u*.

FIG. 5, FIG. 6A, FIG. 6B, and FIG. 6C each indicate a triangle defined by the three positions of the first link connection hole 25*d*, the second link connection hole 25*e*, and the third link connection hole 25*f* connected to each other by the broken lines. A first link movable-side connection shaft 47 serving as a connection part of the first link 35 on the article storage unit side is attached to the first link connection hole 25*d*. A second link movable-side connection shaft 49 serving as a connection part of the second link 37 on the article storage unit side is attached to the second link connection hole 25*e*. A third link movable-side connection shaft 51 serving as a connection part of the third link 39 on the article storage unit side is attached to the third link connection hole 25*f*. The virtual lines connecting the three connection parts of the three links 35, 37, and 39 on the article storage unit 15 side thus form the triangle as viewed in the vehicle width direction.

In the "housed position" illustrated in FIG. 6A, the first link movable-side connection shaft 47 is located forward of the first link fixed-side connection shaft 41 in the vehicle front-rear direction. Similarly, in the "housed position", the second link movable-side connection shaft 49 is located forward of the second link fixed-side connection shaft 43 in the vehicle front-rear direction, and the third link movable-side connection shaft 51 is located forward of the third link fixed-side connection shaft 45 in the vehicle front-rear direction.

In the "intermediate position" illustrated in FIG. 6B, the first link movable-side connection shaft 47 is located below the first link fixed-side connection shaft 41. Similarly, in the "intermediate position" illustrated in FIG. 6B, the second link movable-side connection shaft 49 is located below the second link fixed-side connection shaft 43, and the third link movable-side connection shaft 51 is located below the third link fixed-side connection shaft 45.

In the "drawn position" illustrated in FIG. 6C, the first link movable-side connection shaft 47 is located behind the first link fixed-side connection shaft 41 in the vehicle front-rear direction. Similarly, in the "drawn position", the second link movable-side connection shaft 49 is located behind the second link fixed-side connection shaft 43 in the vehicle front-rear direction, and the third link movable-side connection shaft 51 is located behind the third link fixed-side connection shaft 45 in the vehicle front-rear direction.

Figure 7:
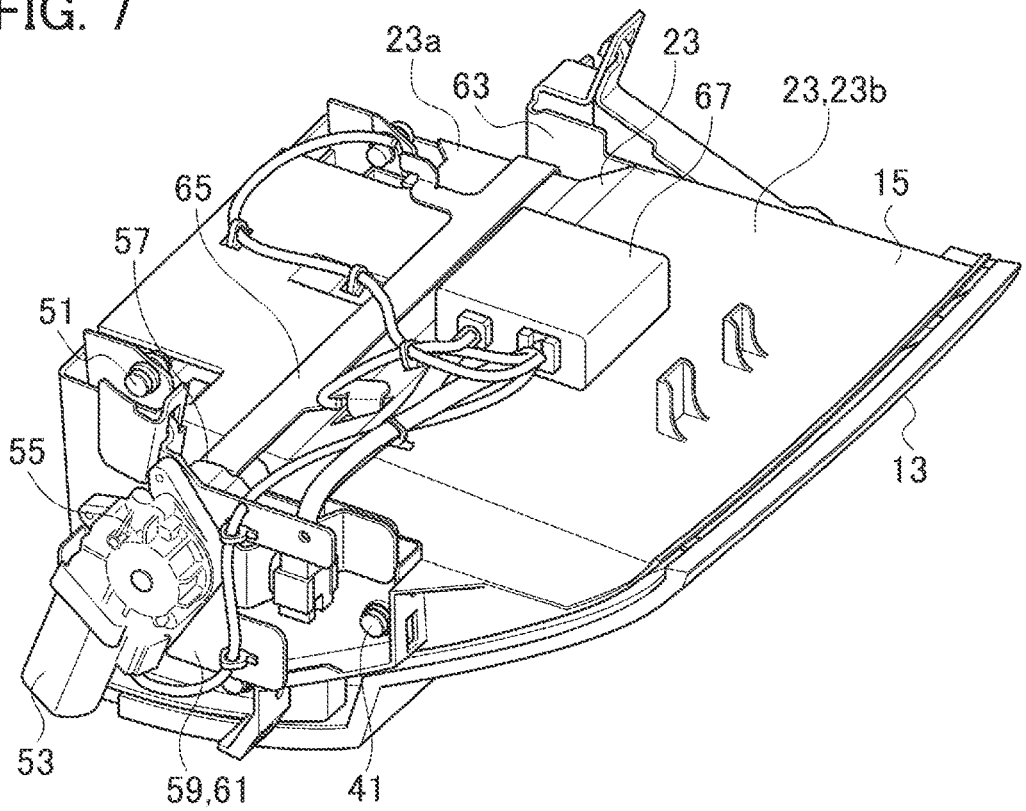
FIG. 7 is a perspective view illustrating a state in which the article storage box according to the first embodiment is housed in the housing unit.

The movement of the article storage box 13 in association with the rotation of the first link 35, the second link 37, and the third link 39 is made by a motor 53 illustrated in FIG. 7 serving as a drive unit descried below. FIG. 7 corresponds to the "housed position" illustrated in FIG. 6A. The rotary driving force made by the motor 53 is transmitted to the third link fixed-side connection shaft 45. The third link fixed-side connection shaft 45 serves as a torque input shaft. The third link 39 serves as a driving link, and the first link 35 and the second link 37 each serve as a driven link.

In the "housed position" illustrated in FIG. 6A, when the third link fixed-side connection shaft 45 is rotated in the counterclockwise direction, the third link 39 is rotated in the same direction about the third link fixed-side connection shaft 45. The third link movable-side connection shaft 51 is then moved downward, as illustrated in FIG. 6B. The article storage box 13 is moved to draw a downward and rearward arc so as to be located at the "intermediate position" in association with the downward movement of the third link movable-side connection shaft 51.

When the article storage box 13 is moved from the "housed position" to the "intermediate position", the first link 35 is rotated in the counterclockwise direction in the state illustrated in FIG. 6A about the first link fixed-side connection shaft 41. Similarly, the second link 37 is rotated in the counterclockwise direction in the state illustrated in FIG. 6A about the second link fixed-side connection shaft 43. The rotation of the first link 35 and the second link 37 in the counterclockwise direction moves the first link movable-side connection shaft 47 and the second link movable-side connection shaft 49 downward and rearward in association with the movement of the article storage box 13.

Figure 8A:
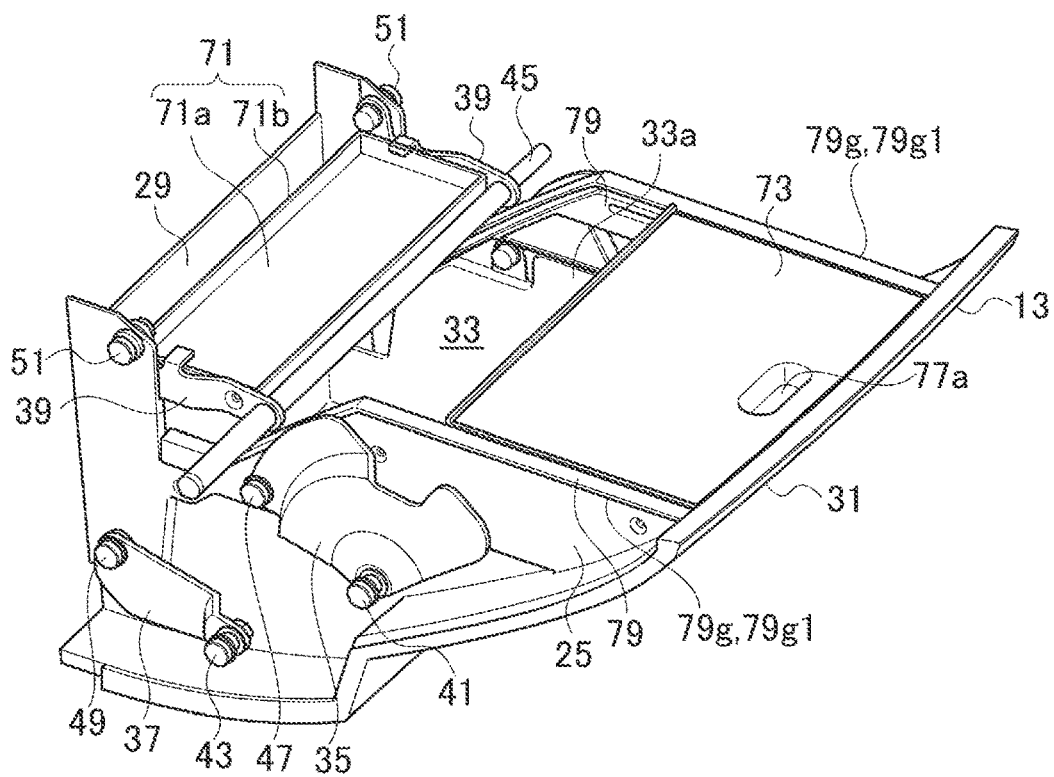
FIG. 8A is a perspective view illustrating the article storage box corresponding to FIG. 6A.
Figure 8B:
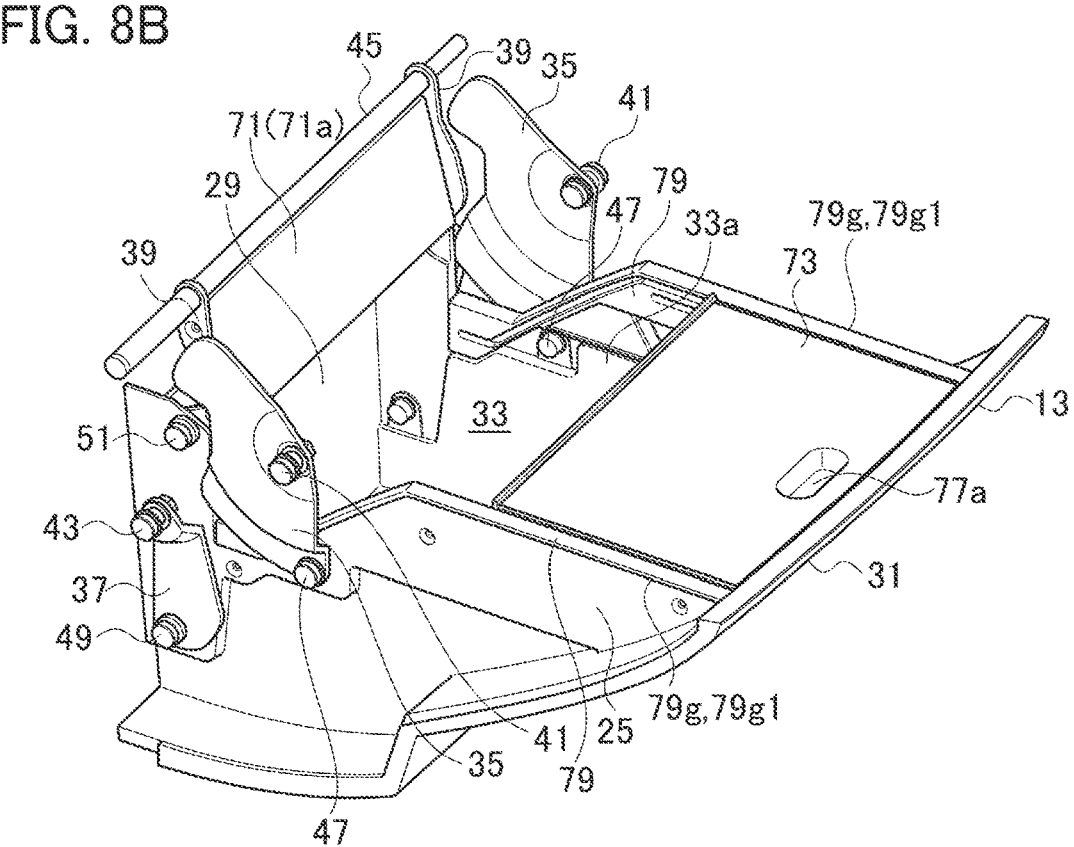
FIG. 8B is a perspective view illustrating the article storage box corresponding to FIG. 6B.
Figure 8C:
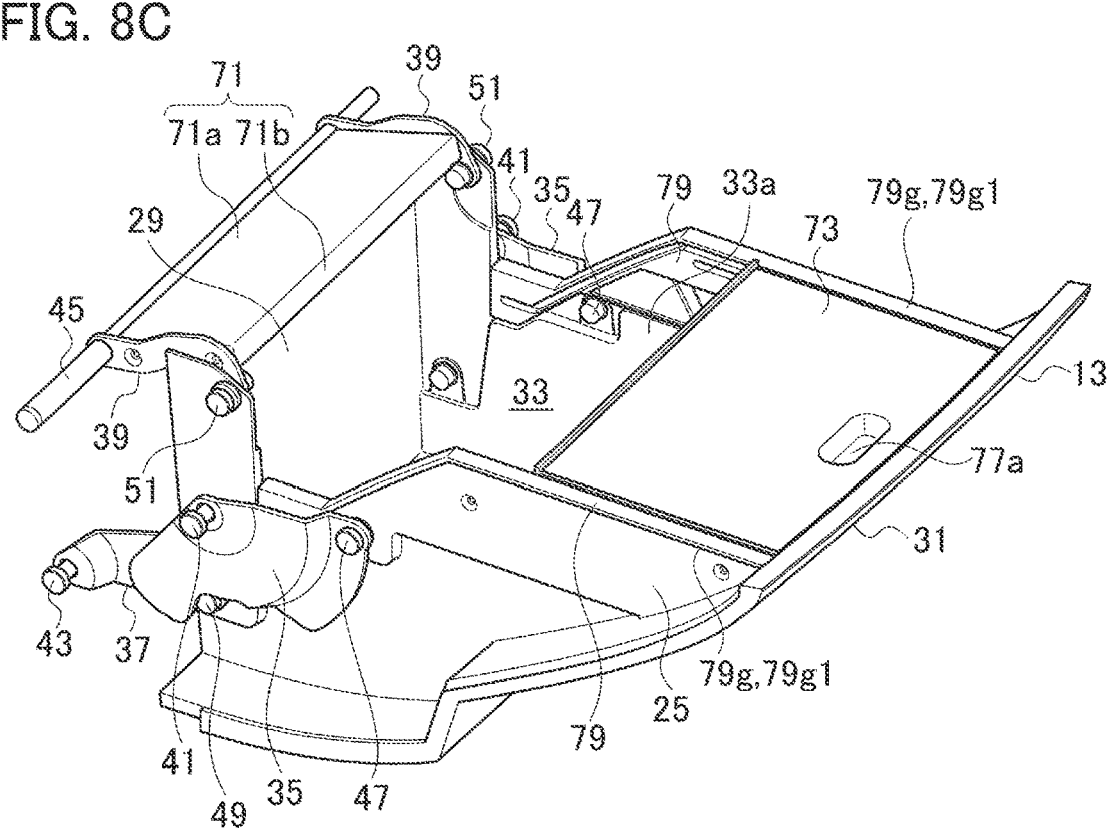
FIG. 8C is a perspective view illustrating the article storage box corresponding to FIG. 6C.

The rotation of the motor 53 illustrated in FIG. 7 is transmitted to a clutch mechanism 57 via a transmission 55. The clutch mechanism 57 is connected with an output shaft (not illustrated), which is connected to the third link fixed-side connection shaft 45 also illustrated in FIG. 8A, FIG. 8B, and FIG. 8C. FIG. 8A, FIG. 8B, and FIG. 8C respectively correspond to FIG. 6A, FIG. 6B, and FIG. 6C. The third link fixed-side connection shaft 45 is a single shaft extending in the vehicle width direction that connects the paired third links 39 located on the right and left sides to each other.

The rotary driving force made by the motor 53 is transmitted to the third link fixed-side connection shaft 45 via the transmission 55, the clutch mechanism 57, and the output shaft (not illustrated). The rotary driving force made by the motor 53 is transmitted to each of the paired third links 39 located on the right and left sides via the single third link fixed-side connection shaft 45. This enables the stable rotation of the paired link mechanisms on the right and left sides, so as to smoothly move the article storage box 13. In the "housed position" illustrated in FIG. 8A, the third link fixed-side connection shaft 45 is located in the notched recesses 25u of the box side walls 25 illustrated in FIG. 5.

As illustrated in FIG. 7, a power unit including the motor 53, the transmission 55, the clutch mechanism 57, and the like is fixed to the housing unit 15 with a unit fixing tool 59. The unit fixing tool 59 includes a left-side bracket 61, a right-side bracket 63, and a connection bar 65 connecting the left-side bracket 61 and the right-side bracket 63 to each other. The left-side bracket 61 supports the motor 53, the transmission 55, and the clutch mechanism 57. The connection bar 65 is arranged over the upper wall front part 23a of the housing unit 15.

An ECU 67 serving as a control unit that drives and controls the motor 53 is arranged on the upper wall rear part 23b. As illustrated in FIG. 1, an operation switch 69 serving as an operation unit for driving the motor 53 is provided at the upper part of the center console 9. An operational signal from the operation switch 69 is read by the ECU 67 so that the ECU 67 controls the motor 53 depending on the operation of the operation switch 69. The operation switch 69 includes two switches of an open switch 69a and a close switch 69b.

The open switch 69a is used for rotating the motor 53 in a regular direction so as to move the article storage box 13 from the "housed position" toward the "drawn position" in a closing direction. The article storage box 13 keeps moving in an opening direction during the state in which the open switch 69a is being pressed, and stops the movement when the motor 53 stops after the pressed state is released. The movement of the article storage box 13 thus can be stopped at an optional position between the "housed position" and the "drawn position". When the open switch 69a is operated at the "intermediate position" between the "housed position" and the "drawn position", for example, the article storage box 13 is moved in the opening direction.

The close switch 69b is used for rotating the motor 53 in a reverse direction so as to move the article storage box 13 from the "drawn position" toward the "housed position" in the closing direction. The article storage box 13 keeps moving in the closing direction during the state in which the close switch 69b is being pressed, and stops the movement when the motor 53 stops after the pressed state is released. The movement of the article storage box 13 thus can be stopped at an optional position between the "drawn position" and the "housed position". When the close switch 69b is operated at the "intermediate position" between the "drawn position" and the "housed position", for example, the article storage box 13 is moved in the closing direction.

At the point at which the article storage box 13 is led to be located at the "drawn position" after the movement in the opening direction, an open-side limit switch (not illustrated) operates to stop the motor 53. Similarly, at the point at which the article storage box 13 is led to be located at the "housed position" after the movement in the closing direction, a close-side limit switch (not illustrated) operates to stop the motor 53. The signals from the open-side limit switch and the close-side limit switch are read by the ECU 67 so as to stop the motor 53.

If an excessive load is applied to the motor 53 during the operation of the motor 53 because of the contact of any article stored in the article storage box 13 with the housing unit 15, for example, the clutch mechanism 57 operates to idle the motor 53. This protects the motor 53. Instead of the clutch mechanism 57, the ECU 67 may control the motor 53 to stop when detecting a state in which a current flowing through the motor 53 reaches an excessive value.

The operation switch 69 can be operated during a state in which an ignition switch of the vehicle is in the ON state and the engine is operating and during a state in which the vehicle is traveling. The operation on the operation switch 69 can also be blocked during the state in which the vehicle is traveling. The operation switch 69 can be operated in a state in which the ignition switch is in the OFF state and an accessory switch is in the ON state.

As illustrated in FIGS. 8A, 8B, and 8C, a partition plate 71 serving as a partition member is placed between the pair of the third links 39 located on the right and left sides. The partition plate 71 includes a plate part 71a having a rectangular shape longer in the vehicle width direction, and an edge part 71b extending upward along the circumferential edge of the plate part 71a, as illustrated in FIG. 8A. The partition plate 71 is arranged such that the edge part 71b on both sides in the vehicle width direction is attached to the third links 39 in the state of being located between the third link fixed-side connection shaft 45 and the third link movable-side connection shaft 51.

The plate part 71a of the partition plate 71 is placed in the substantially horizontal state at the "housed position" illustrated in FIG. 8A and at the "drawn position" illustrated in FIG. 8C. The plate part 71a of the partition plate 71 is placed in the substantially vertical state at the "intermediate position" illustrated in FIG. 8B. The partition plate 71 when located at the "intermediate position" partitions the article storage box 13 to define the vehicle forward side and the vehicle rearward side at the upper part on the vehicle forward side with the plate part 71a placed in the substantially vertical state. The partition plate 71 at this point serves as a wall part continuously extending from the box front wall 29 of the article storage box 13.

Figure 9:
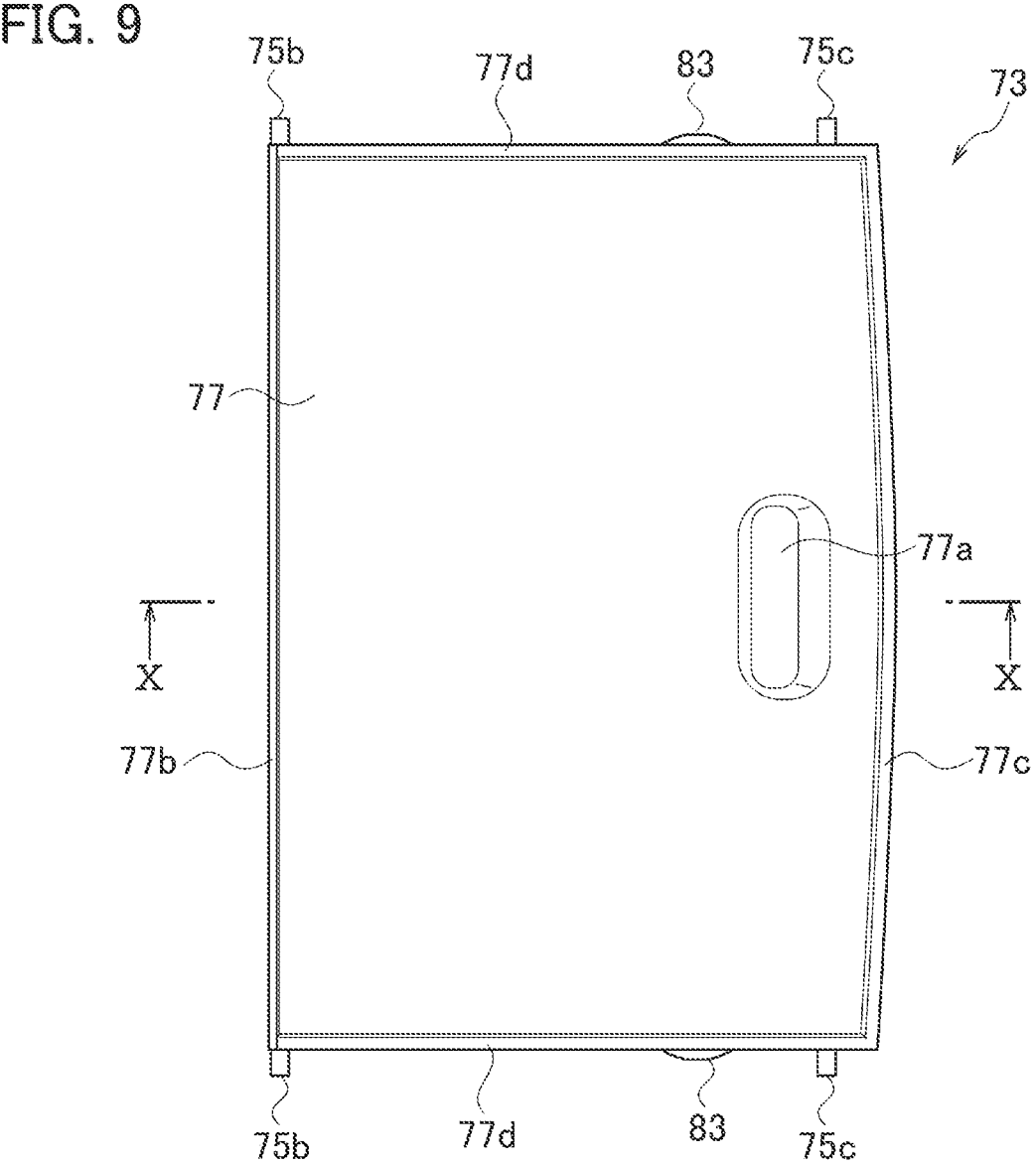
FIG. 9 is a plan view illustrating a slide table.
Figure 10:
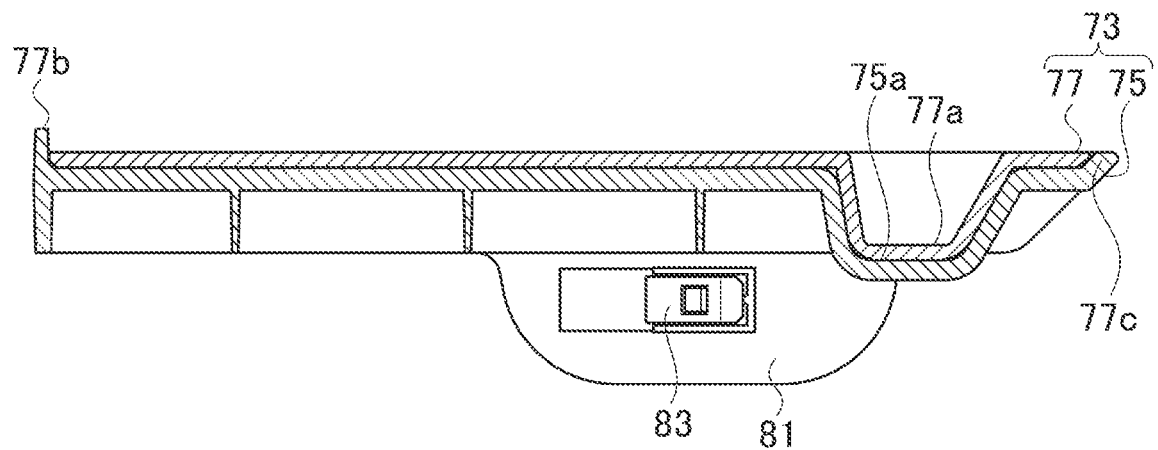
FIG. 10 is a cross-sectional view taken along line X-X in FIG. 9.
Figure 11:
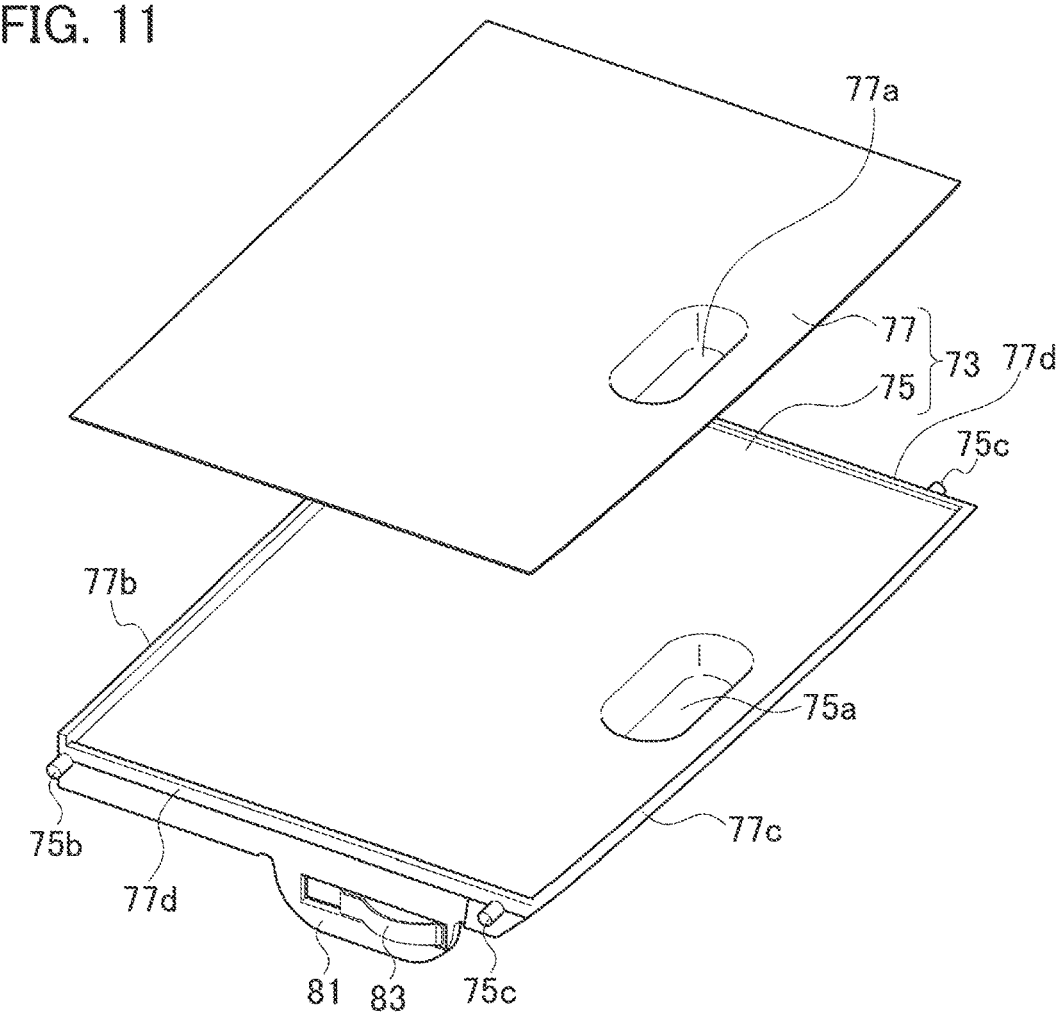
FIG. 11 is an exploded perspective view illustrating the slide table.

The article storage box 13 includes a slide table 73 that slides to move in the vehicle front-rear direction at the opening 33a. As illustrated in FIG. 9 to FIG. 11, the slide table 73 includes a table body 75, and a nonslip plate 77 attached on the top surface of the table body 75. The surface of the nonslip plate 77 has the properties of preventing articles placed thereon from slipping on the surface. The nonslip plate 77 is made from rubber, for example, so as to avoid the slip of the articles.

A recess 75a is provided on the top surface of the table body 75 on the rear side in the vehicle front-rear direction. The nonslip plate 77 is provided with a fitting recess 77a corresponding to the recess 75a. The nonslip plate 77 is fixed to the table body 75 with an adhesive, for example, in a state in which the fitting recess 77a is fitted to the recess 75a. Hooking the finger in the fitting recess 77a enables the operation of moving the slide table 73 in the front-rear direction.

The outer circumferential edge of the table body 75 is provided with a front projection 77b, a rear projection 77c, and right-left projections 77d. The front projection 77b and the right-left projections 77d project in the vertical direction (upward in FIG. 10) from the surface of the table body 75. The rear projection 77c projects to be inclined upward from the surface of the table body 75 in a direction in which the upper end is located further from the front projection 77b than the lower end.

As illustrated in FIG. 10, the front projection 77b projects upward more than the rear projection 77c and the right-left projections 77d. The rear projection 77c and the right-left projections 77d project upward to have substantially the same height as illustrated in FIG. 10. The height of each of the rear projection 77c and the right-left projections 77d projecting upward in FIG. 10 is substantially the same as the plate thickness of the nonslip plate 77. The top surface of the nonslip plate 77 and the respective upper edges of the rear projection 77c and the right-left projections 77d are substantially on the same plane in the state in which the nonslip plate 77 is attached to the table body 75. The front projection 77b projects upward more than the top surface of the nonslip plate 77. The front projection 77b prevents articles placed on the slide table 73 from moving toward the front side.

A pair of right and left front guide projections 75b are provided at front ends on both right and left sides of the table body 75, and a pair of right and left rear guide projections 75c are provided at rear ends on both right and left sides of the table body 75. The front guide projections 75b and the rear guide projections 75c are guided by a pair of right and left guide members 79 illustrated in FIG. 12. The paired right and left guide members 79 are attached on the inside of the box side walls 25 of the article storage box 13, as illustrated in FIG. 8A, FIG. 8B, and FIG. 8C. The pair of the guide members 79 have a symmetrical structure.

The guide members 79 each include a rear part 79a having a substantially parallelogram longer in the vehicle front-rear direction, and a front part 79b located on the front-lower side of the rear part 79a, as viewed in the vehicle width direction. A rear guide groove 79d is provided on the respective inner surfaces of the rear parts 79a opposed to each other. A front guide groove 79c is provided on the respective inner surfaces of the rear parts 79a and the front parts 79b opposed to each other. The front guide projections 75b are inserted to the front guide grooves 79c, and the rear guide projections 75c are inserted to the rear guide grooves 79d.

The rear guide grooves 79d each extend in the front-rear direction at a position adjacent to the upper edge of the rear part 79a. The rear guide grooves 79d each include a rear-side first guide part 79d1 located on the rear side at a position closer to the upper edge of the rear part 79a, and a rear-side second guide part 79d2 located on the front-lower side of the rear-side first guide part 79d1. The rear-side first guide part 79d1 and the rear-side second guide part 79d2 are parallel to each other in the horizontal state, and are connected to each other via a rear-side third guide part 79d3. The rear-side third guide part 79d3 is inclined such that the front portion is located on the lower and front sides of the rear portion. The rear-side second guide part 79d2 has a sufficiently greater length than the rear-side first guide part 79d1 in the front-rear direction.

The front guide grooves 79c each include a front-side first guide part 79c1 located on the front side in the rear part 79a at a position having the same height as the rear-side first guide part 79d1 in the upper-lower direction, and a front-side second guide part 79c2 located in the front part 79b. The front-side first guide part 79c1 and the rear-side first guide part 79d1 have substantially the same length in the front-rear direction. The front-side first guide part 79c1 and the front-side second guide part 79c2 are parallel to each other in the horizontal state, and are connected to each other via a front-side third guide part 79c3. The front-side third guide part 79c3 is inclined such that the front portion is located on the lower and front sides of the rear portion. The front-side first guide part 79c1 overlaps with a part of the rear-side second guide part 79d2 on the front side in the front-rear direction. The front-side third guide part 79c3 is formed along the inclined part of the rear part 79a on the front side, and has a greater inclination degree than the front-side third guide part 79c3.

Figure 12:
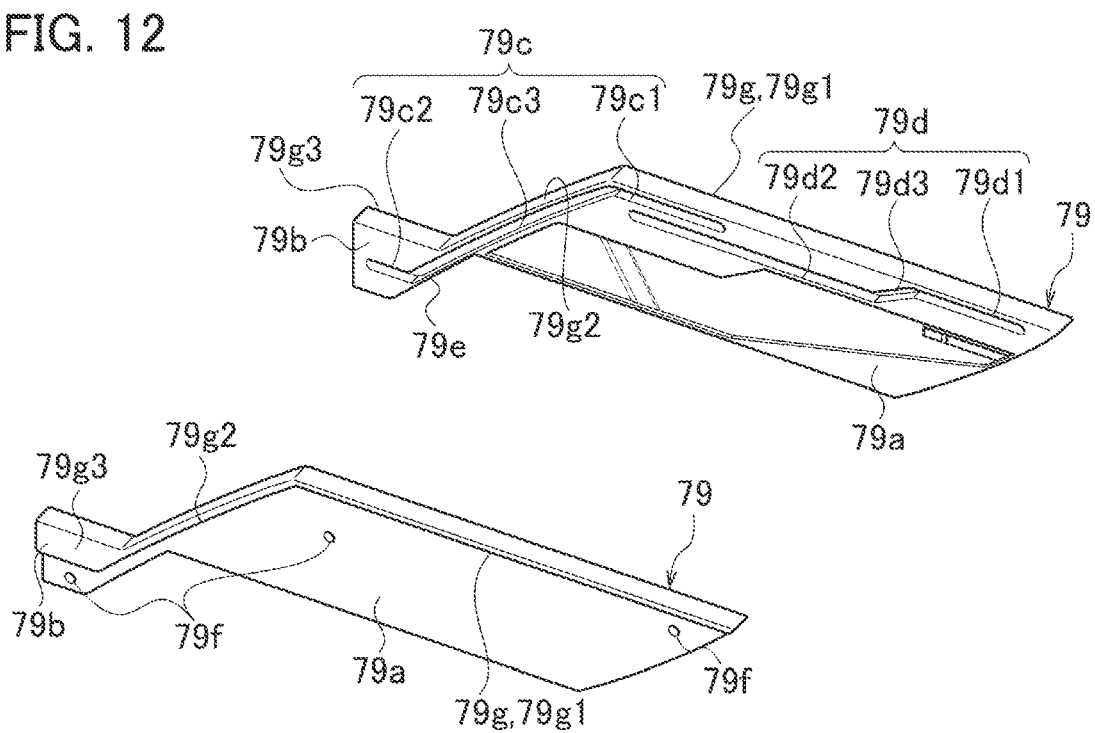
FIG. 12 is a perspective view illustrating guide members for guiding the slide table.

As illustrated in FIG. 5, a step 25g is provided on the inner surface of the respective box side walls 25 with the lower side projecting to the inside of the article storage box 13 more than the upper side. The guide member 79 illustrated in FIG. 12 is arranged on the step 25g. The inner surface of the guide member 79 and the inner surface of the box side wall 25 on the lower side of the step 25g in this arranged state are substantially on the same plane. The respective guide members 79 include a projection mount part 79g projecting outward from the article storage box 13 in the vehicle width direction with the upper end entirely extending in the front-rear direction in the state of being attached to the article storage box 13 illustrated in FIG. 5 (refer to FIG. 8A, FIG. 8B, and FIG. 8C). Placing the projection mount part 79g at the upper edge of the respective box side walls 25 leads to the attached state illustrated in FIG. 8A, FIG. 8B, and FIG. 8C.

The projection mount part 79g includes a rear mount part 79g1 located at the upper edge of the rear part 79a, an inclined mount part 79g2 extending in the diagonally downward direction from the front end of the rear mount part 79g1, and a front mount part 79g3 extending forward from the front end of the inclined mount part 79g2. The rear mount part 79g1 is placed on the upper edge of the respective side walls 25. The inclined mount part 79g2 is placed on the inclined part 25u1 of the respective notched recesses 25u. The front mount part 79g3 is placed on the bottom part 25u3 of the respective notched recesses 25u.

The step 25g includes a rear contact part 25g1 substantially in contact with the lower surface 79a of the respective guide members 79, and a front contact part 25g2 substantially in contact with the lower surface of the front part 79b of the respective guide members 79. The step 25g further includes an inclined part 25g3 extending in the diagonally upward direction from the rear end of the front contact part 25g2. A lower part of an inclined surface 79e on the rear side of the front part 79b is substantially in contact with the inclined part 25g3. The guide member 79 is attached to the respective box side walls 25 such that bolts are inserted to three attachment holes 25h provided on the respective box side walls 25 from the outside of the respective box side walls 25 so that the bolts are fastened to three screw holes 79f provided on the guide member 79.

As illustrated in FIG. 10 and FIG. 11, a plate spring support part 81 projecting downward is provided at a lower part on both right and left sides of the table body 75. The plate spring support part 81 is located in front of the respective rear-side guide projections 75c on the rear side of the table body 75 in the vehicle front-rear direction. A plate spring 83 is attached to the respective plate spring support parts 81. As illustrated in FIG. 9 and FIG. 11, the respective plate springs 83 project to the outside from the slide table 73 in the vehicle width direction so as to elastically press the inner surfaces of the guide members 79 in the state in which the slide table 73 is attached to the guide members 79. The elastic press causes an appropriate frictional force when the slide table 73 is moved forward and rearward with respect to the guide members 79, so as to allow the smooth movement of the slide table 73 while avoiding unstableness.

The slide table 73 is led to the state as illustrated in FIG. 8A, FIG. 8B, and FIG. 8C, for example, when the front-side guide projections 75b are located in the front-side first guide parts 79c1 and the rear-side guide projections 75c are located in the rear-side first guide parts 79dl. FIG. 8A, FIG. 8B, and FIG. 8C each illustrate the state in which the slide table 73 is located on the rearmost side so that the end of the slide table 73 on the rear side is substantially in contact with the article storage box 13. The end of the slide table 73 on the front side at this point is located behind the front end of the upper surface of the rear part 79a of the respective guide members 79.

The upper surface of the slide table 73 is substantially on the same plane as the upper end surface of the respective rear parts 79a (the upper surface of the respective rear mount parts 79g1) when the front-side guide projections 75b are located in the front-side first guide parts 79c1 and the rear-side guide projections 75c are located in the rear-side first guide parts 79d1. When the slide table 73 is moved forward from the state illustrated in FIG. 8A, FIG. 8B, and FIG. 8C, the front-side guide projections 75b are moved forward along the front-side first guide parts 79c1 and then reach the front-side third guide parts 79c3. The rear-side guide projections 75c at this point are moved forward along the rear-side first guide parts 79d1 and then reach the rear-side third guide parts 79d3.

The front-side guide projections 75b are located in the middle of the front-side third guide portions 79c3 at the point at which the rear-side guide projections 75c reaches the rear-side second guide parts 79d2 after being moved from the rear-side third guide parts 79d3. When the slide table 73 is further moved forward from this state, the rear-side guide projections 75c are horizontally moved forward along the rear-side second guide parts 79d2, while the front-side guide projections 75b are moved forward and downward along the front-side third guide parts 79c3. The slide table 73 is thus inclined such that the front-side portion is located below the rear-side portion.

The gradual movement of the front-side guide projections 75b in the forward and downward direction along the front-side third guide parts 79c3 leads the inclined angle of the slide table 73 described above to be gradually steep. The inclined angle described above is steepest at the point at which the front-side guide projections 75b reach the front-side guide parts 79c2 through the front-side third guide parts 79c3. After the rear-side guide projections 75c are further moved forward along the rear-side second guide part 79d, and the front-side guide projections 75b are moved to reach the end of the front-side second guide parts 79c2 on the front side, the forward movement of the slide table 73 is stopped.

Figure 13:
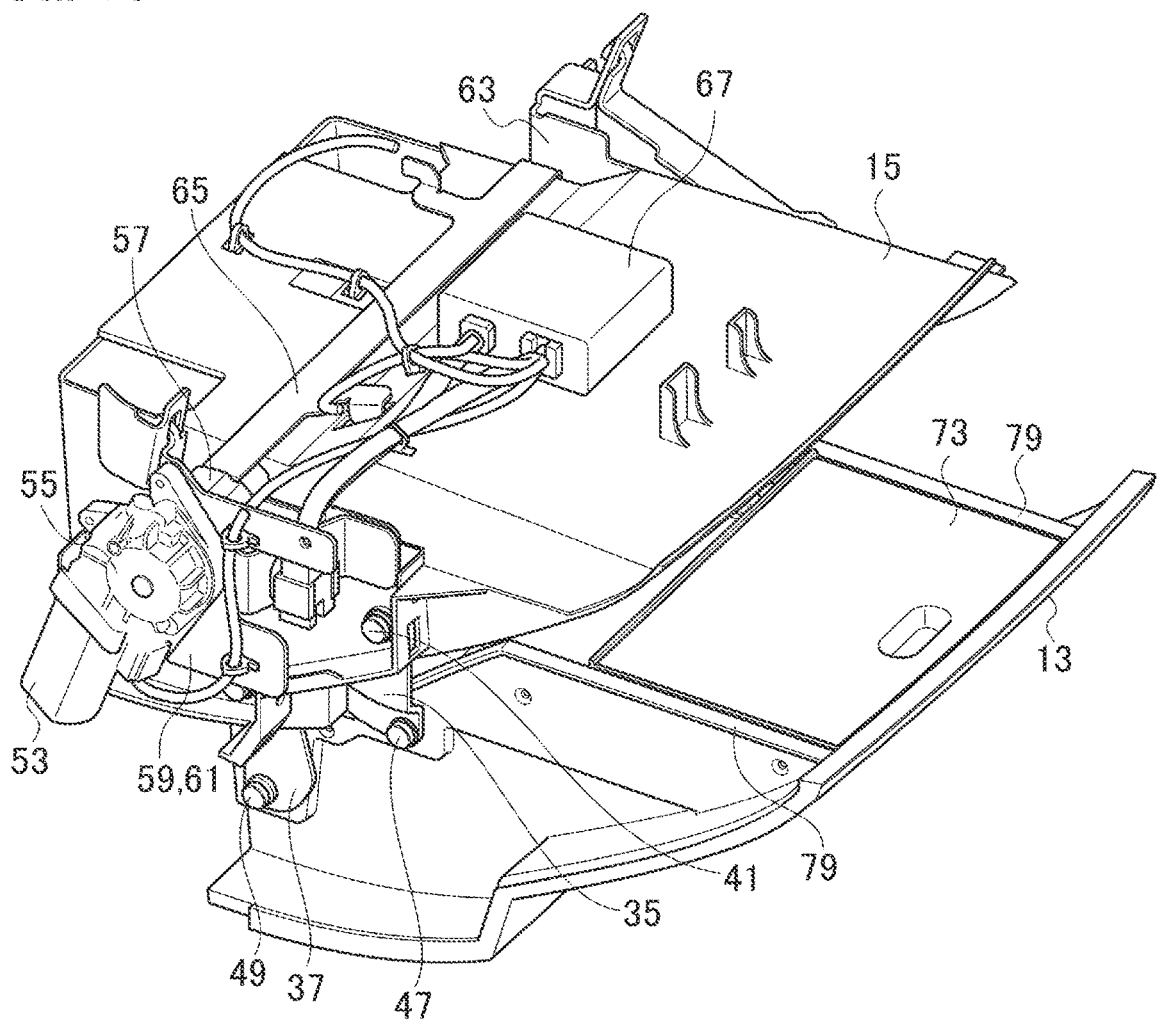
FIG. 13 is a perspective view when the article storage box according to the first embodiment is shifted to the intermediate position from the housed position illustrated in FIG. 7.
Figure 14:
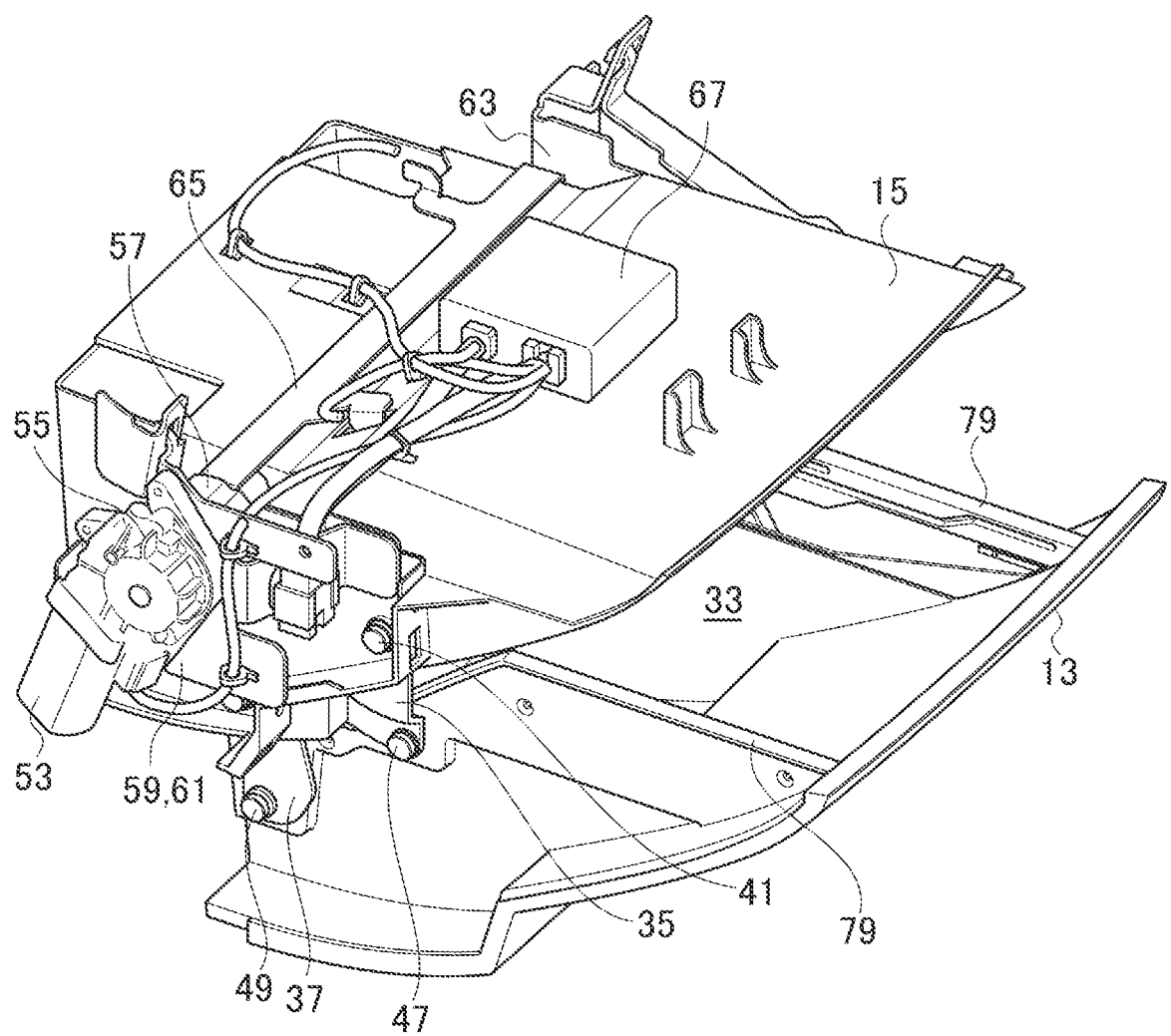
FIG. 14 is a perspective view when the slide table is shifted to a table housed position from the state illustrated in FIG. 13.
Figure 15:
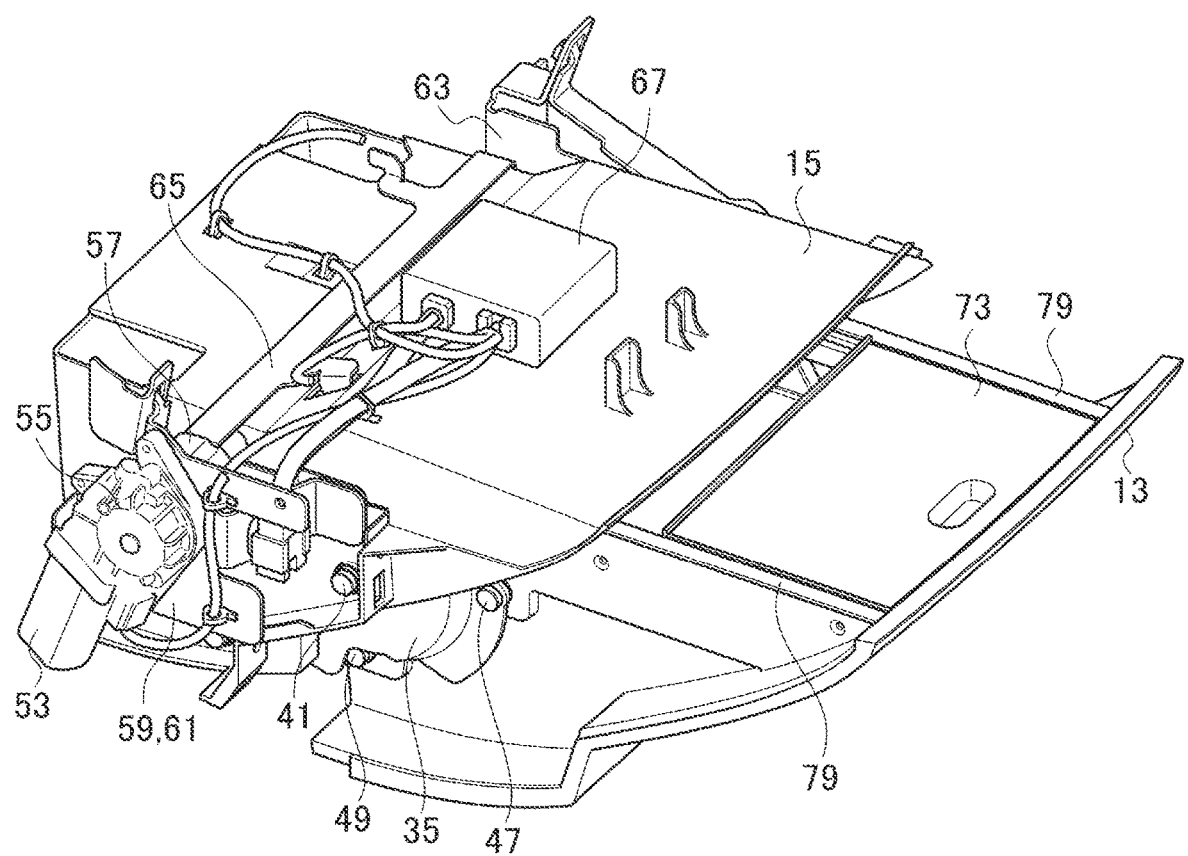
FIG. 15 is a perspective view when the article storage box according to the first embodiment is shifted to the drawn position from the intermediate position illustrated in FIG. 13.
Figure 16:
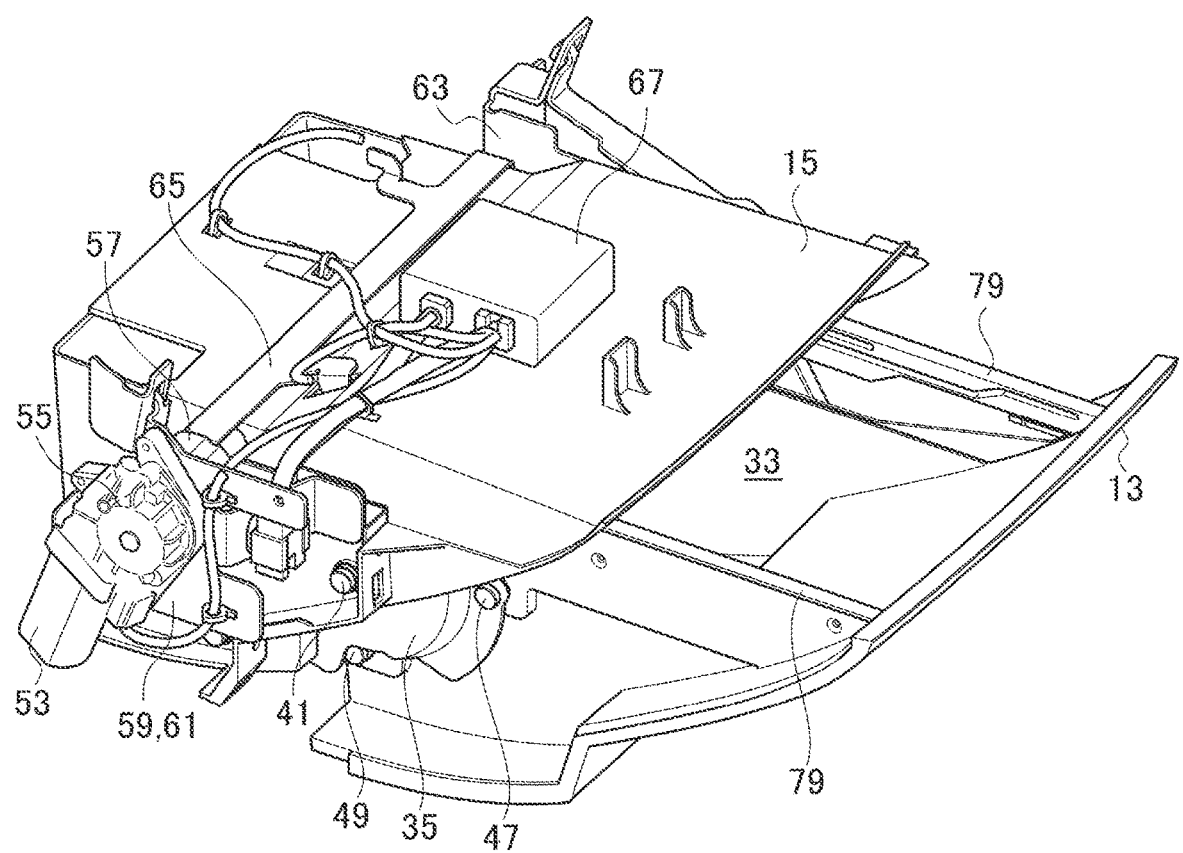
FIG. 16 is a perspective view when the slide table is shifted to the table housed position from the state illustrated in FIG. 15.

As illustrated in FIG. 8A, FIG. 8B, and FIG. 8C, the state in which the slide table 73 is moved to be located on the rearmost side is referred to below as a "table drawn position" of the slide table 73, and the state in which the slide table 73 is moved to be located on the frontmost side is referred to below as a "table housed position" of the slide table 73. FIG. 13 illustrates the state in which the slide table 73 is located at the "table drawn position" at the "intermediate position", and FIG. 14 illustrates the state in which the slide table 73 is located at the "table housed position" at the "intermediate position". FIG. 15 illustrates the state in which the slide table 73 is located at the "table drawn position" at the "drawn position", and FIG. 16 illustrates the state in which the slide table 73 is located at the "table housed position" at the "drawn position".

At the "table drawn position" illustrated in FIG. 13 and FIG. 15, a laptop computer or a tablet terminal can be put on the drawn slide table 73 during the stop of the vehicle, so as to enable the occupant to enjoy entertainment content or do a job. Putting food and drink on the drawn slide table 73 also enables the occupant to have a meal. At the "table housed position" illustrated in FIG. 14, and FIG. 16, the occupant can put articles in and take the articles out of the article storage space 33 of the article storage box 13 through the opening 33a.

As illustrated in FIG. 6A, FIG. 6B, and FIG. 6C, the first link 35 has a larger surface area as viewed in the vehicle width direction at a part substantially implementing the link between the first link fixed-side connection shaft 41 and the first link movable-side connection shaft 47. The part of the first link 35 having the larger surface area covers the outside first at the circumference of the notched recess 25u of the respective box side walls 25 in the operating range particularly between the "intermediate position" illustrated in FIG. 13 and FIG. 14 and the "drawn position" illustrated in FIG. 15 and FIG. 16.

The operational effects of the present embodiment are described below.

The present embodiment includes the article storage box 13 provided with the opening 33a on the upper side for getting articles in and out, and the housing unit 15 installed on the lower side of the instrument panel 3 to house the article storage box 13. The first link 35, the second link 37, and the third link 39 movably support the article storage box 13 between the housed position at which the article storage box 13 is housed in the housing unit 15 and the drawn position at which the article storage box 13 is drawn in the vehicle compartment rearward direction from the housed position.

The first link 35 is placed such that the first link movable-side connection shaft 47 on the article storage box 13 side is located forward of the first link fixed-side connection shaft 41 on the housing unit 15 side at the "housed position", the first link movable-side connection shaft 47 is located behind the first link fixed-side connection shaft 41 at the "drawn position", and the first link movable-side connection shaft 47 is located below the first link fixed-side connection shaft 41 at the "intermediate position". The second link 37 is placed such that the second link movable-side connection shaft 49 on the article storage box 13 side is located forward of the second link fixed-side connection shaft 43 on the housing unit 15 side at the "housed position", the second link movable-side connection shaft 49 is located behind the second link fixed-side connection shaft 43 at the "drawn position", and the second link movable-side connection shaft 49 is located below the second link fixed-side connection shaft 43 at the "intermediate position". The third link 39 is placed such that the third link movable-side connection shaft 51 on the article storage box 13 side is located forward of the third link fixed-side connection shaft 45 on the housing unit 15 side at the "housed position", the third link movable-side connection shaft 51 is located behind the third link fixed-side connection shaft 45 at the "drawn position", and the third link movable-side connection shaft 51 is located below the third link fixed-side connection shaft 45 at the "intermediate position".

The article storage box 13 is thus rotated to draw a downward arc as viewed on the lateral side so as to be moved from the "housed position" illustrated in FIG. 6A via the "intermediate position" illustrated in FIG. 6B located on the lower and rear sides of the "housed position" to the "drawn position" illustrated in FIG. 6C located on the upper and rear sides of the "intermediate position". The rotational movement of the article storage box 13 described above can be made in the case in which the slide table 73 is located either at the "table drawn position" or at the "table housed position".

The rotational movement of the article storage box 13 that draws the downward arc can prevent articles from being caught by the housing unit 15 and enable the smooth open-close movement, as compared with a case in which the article storage box 13 is simply moved horizontally in the front-rear direction, when a lot of articles are forced to be put into the article storage space 33, for example. As illustrated in FIG. 14, the article storage box 13 is located at a lower level at the "intermediate position" than at the "housed position" and the "drawn position". This facilitates the operation of getting the articles in and out and allows the occupant to easily find the stored articles in the state in which the slide table 73 is located at the "table housed position".

The present embodiment also includes the motor 53 that rotates and drives the third link 39 so as to move the article storage box 13 between the "housed position" and the "drawn position", and the open switch 69a and the close switch 69b that can stop the drive of the motor 53 at an optional rotating position of the third link 39.

The article storage box 13 keeps moving in the opening direction during the state in which the open switch 69a is being pressed, and stops the movement when the operation of pressing the open switch 69a stops. Similarly, the article storage box 13 keeps moving in the closing direction during the state in which the close switch 69b is being pressed, and stops the movement when the operation of pressing the close switch 69b stops. This enables the occupant to stop the article storage box 13 at any open position, so as to improve the operability.

The present embodiment includes the three links of the first link 35, the second link 37, and the third link 39. The first link fixed-side connection shaft 41, the second link fixed-side connection shaft 43, and the third link fixed-side connection shaft 45 of the three links on the housing unit 15 side are arranged to be located at the apexes of the triangle as viewed in the vehicle width direction. The first link movable-side connection shaft 47, the second link movable-side connection shaft 49, and the third link movable-side connection shaft 51 of the three links on the article storage box 13 side are arranged to be located at the apexes of the triangle as viewed in the vehicle width direction.

A moment of rotating in the clockwise direction in FIG. 6A about the third link movable-side connection shaft 51 of the third link 39 serving as a driving link is caused in the article storage box 13 due to its empty weight. The second link movable-side connection shaft 49 of the second link 37 serving as a driven link is connected to the third link movable-side connection shaft 51 via the article storage box 13. The moment M about the third link movable-side connection shaft 51 is thus caused in the second link movable-side connection shaft 49. The moment M is applied in the forward direction substantially perpendicular to the line connecting the second link movable-side connection shaft 49 and the third link movable-side connection shaft 51 to each other.

The moment M caused in the second link movable-side connection shaft 49 in this case is applied in the longitudinal direction of the second link 37 when located at the "housed position" illustrated in FIG. 6A. The moment M, if caused in the second link movable-side connection shaft 49, is offset by a counterforce P caused in the second link 37. The link mechanism thus operates so as to keep the attitude of the article storage box 13 at the "housed position". The moment M is caused at the "drawn position" illustrated in FIG. 6C in the same direction as the "housed position" illustrated in FIG. 6A, and is offset by the counterforce P caused in the second link 37. The link mechanism thus operates so as to keep the attitude of the article storage box 13 also at the "drawn position".

The moment M caused in the second link movable-side connection shaft 49 is applied in the direction substantially perpendicular to the longitudinal direction of the second link 37 when located at the "intermediate position" illustrated in FIG. 6B. Since the second link 37 in this case cannot generate the counterforce against the moment M, the link mechanism does not operate to keep the attitude of the article storage box 13. The first link 35 that is the other driven link then operates so as to keep the attitude of the article storage box 13 when located at the "intermediate position".

The first link movable-side connection shaft 47 of the first link 35 is connected to the third link movable-side connection shaft 51 via the article storage box 13. The moment M about the third link movable-side connection shaft 51 is thus caused in the first link movable-side connection shaft 47. The moment M caused in the first link movable-side connection shaft 47 illustrated in FIG. 6B is not completely applied in the longitudinal direction of the first link 35 (in the direction connecting the first link fixed-side connection shaft 41 and the first link movable-side connection shaft 47). A component of the counterforce P against the moment M is, however, applied in the longitudinal direction of the first link 35.

The moment M, if caused in the first link movable-side connection shaft 47, is thus offset by the component of the counterforce P applied in the longitudinal direction of the first link 35. The link mechanism then operates so as to keep the attitude of the article storage box 13 when located at the "intermediate position". When the counterforce P cannot be caused against the moment M applied to the second link movable-side connection shaft 49, the counterforce P caused in the first link movable-side connection shaft 47 is preferably applied in the longitudinal direction of the first link 35 (in the direction connecting the first link fixed-side connection shaft 41 and the first link movable-side connection shaft 47).

When the article storage box 13 is located between the "housed position" and the "intermediate position" and between the "intermediate position" and the "drawn position", at least either the first link 35 or the second link 37 causes the counterforce in the direction opposite to the moment direction. The link mechanism thus operates so as to keep the attitude of the article storage box 13 according to the present embodiment located at any position between the "housed position" and the "drawn position".

Between the pair of the third links 39 according to the present embodiment, the partition plate 71 is provided between the third link fixed-side connection shaft 45 and the third link movable-side connection shaft 51 to partition the article storage box 13 to define the vehicle forward side and the vehicle rearward side at the upper part of the article storage box 13 on the vehicle forward side when located at the "intermediate position". As illustrated in FIG. 8B, the partition plate 71 is positioned to serve as a wall connected to the upper side of the box front wall 29 of the article storage box 13. This positioning can prevent the articles stored in the article storage box 13 located at the "intermediate position" from moving in the forward direction to drop down.

The present embodiment includes the slide table 73 movable in the vehicle front-rear direction and provided at the opening 33a of the article storage box 13. Locating the slide table 73 at the "table drawn position" as illustrated in FIG. 2 and FIG. 3 enables the occupant to put a laptop computer or a tablet terminal on the drawn slide table 73, so as to enjoy entertainment content or do a job during the stop of the vehicle. Putting food and drink on the drawn slide table 73 also enables the occupant to have a meal. At the "table housed position" as illustrated in FIG. 14, and FIG. 16, the occupant can put articles in and take the articles out of the article storage space 33 of the article storage box 13 through the opening 33a.

The surface of the slide table 73 according to the present embodiment is provided with the nonslip plate 77 having the properties of preventing articles from slipping on the surface. The nonslip surface can avoid the movement of the articles placed on the slide table 73.

The present embodiment includes the motor 53 that rotates and drives the third link 39 so as to move the article storage box 13 between the "housed position" and the "drawn position", and the ECU 67 that controls the motor 53 in the state in which the ignition switch of the vehicle is in the OFF state and the accessory switch is in the ON state. The operation of opening and closing the article storage box 13 in this case can also be made in the state in which the accessory switch is in the ON state before the start of the engine or after the stop of the engine.

Second Embodiment

A vehicle article storage structure according to a second embodiment is described below. The vehicle article storage structure according to the second embodiment differs from the vehicle article storage structure according to the first embodiment mainly in the link mechanism for moving the article storage box 13. The explanations common to the first embodiment are omitted below, and the points different from the first embodiment are mainly described below.

Figure 17A:
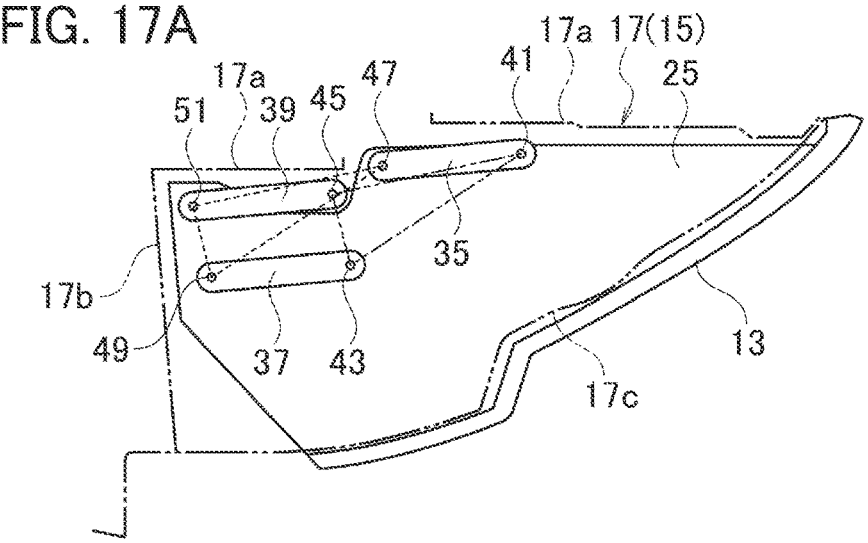
FIG. 17A is a side view illustrating positions of links when an article storage box according to a second embodiment is located at a housed position.
Figure 17B:
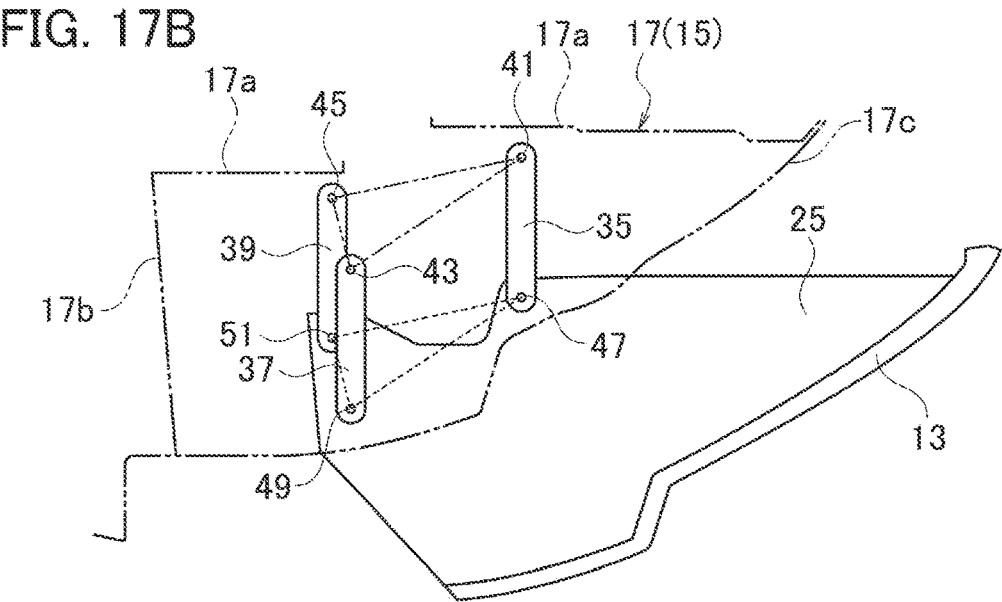
FIG. 17B is a side view illustrating the positions of the links when the article storage box according to the second embodiment is located at an intermediate position.
Figure 17C:
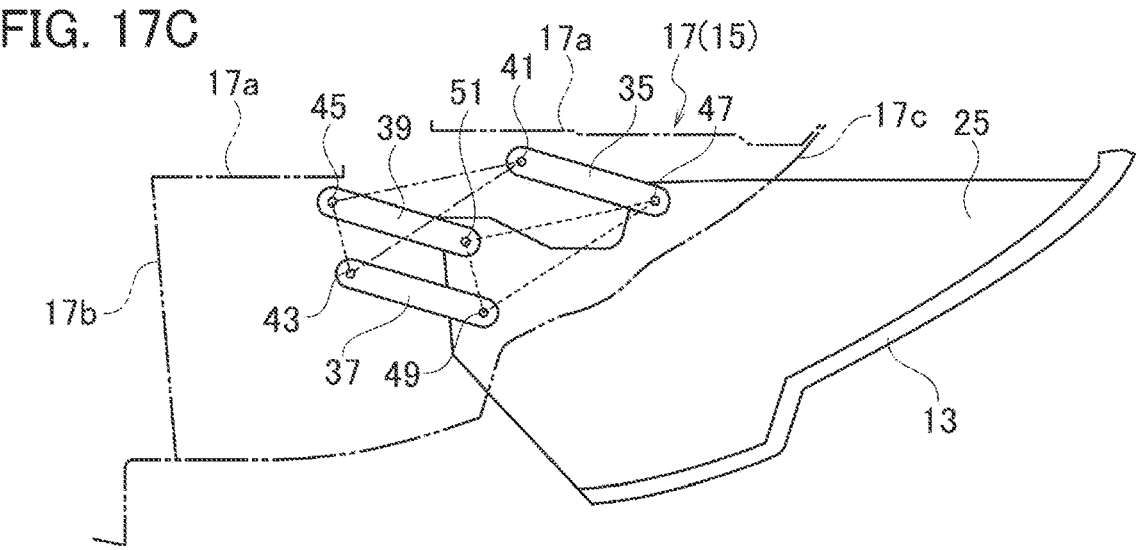
FIG. 17C is a side view illustrating the positions of the links when the article storage box according to the second embodiment is located at a drawn position.

FIG. 17A, FIG. 17B, and FIG. 17C each indicate the position of the housing side wall 17 of the housing unit 15 by the dashed and double-dotted lines. According to the second embodiment, the length from the upper edge 17a to the curved edge 17c is expanded on the basis of the region in the housing side wall 17 on the vehicle forward side, and the housing side wall 17 extends downward more than that in the first embodiment.

FIG. 17A, FIG. 17B, and FIG. 17C illustrate the movement of the link mechanism according to the second embodiment at each of the "housed position", the "intermediate position", and the "drawn position". The link mechanism according to the second embodiment movably supports the article storage box 13 between the "housed position", the "drawn position", and the "intermediate position", in the same manner as the first embodiment. The link mechanism according to the second embodiment includes the first link 35, the second link 37, and the third link 39.

One end of the respective three links 35, 37, and 39 corresponds to the connection shaft on the housing unit 15 side of the respective links 35, 37, and 39. The other end of the respective three links 35, 37, and 39 corresponds to the connection shaft on the article storage box 13 side of the respective links 35, 37, and 39.

The first link 35 has an elliptic shape longer in the shaft-connecting direction connecting the connection shaft on the housing unit 15 side and the connection shaft on the article storage box 13 side. Similar to the first link 35, the second link 37 and the third link 39 each have an elliptic shape longer in the shaft-connecting direction connecting the connection shaft on the housing unit 15 side and the connection shaft on the article storage box 13 side.

The connection part of the first link 35 on the housing unit 15 side corresponds to the first link fixed-side connection shaft 41, and the connection part of the second link 37 on the housing unit 15 side corresponds to the second link fixed-side connection shaft 43. The connection part of the third link 39 on the housing unit 15 side corresponds to the second link fixed-side connection shaft 43. The virtual lines (the dashed and double-dotted lines) connecting between the first link fixed-side connection shaft 41, the second link fixed-side connection shaft 43, and the third link fixed-side connection shaft 45 form a triangle as viewed in the vehicle width direction. The first link fixed-side connection shaft 41, the second link fixed-side connection shaft 43, and the third link fixed-side connection shaft 45 are attached to the housing unit 15 so that the triangle defined by the virtual lines are located at the upper part of the housing unit 15.

The connection part of the first link 35 on the article storage box 13 side corresponds to the first link movable-side connection shaft 47, and the connection part of the second link 37 on the article storage box 13 side corresponds to the second link movable-side connection shaft 49. The connection part of the third link 39 on the article storage box 13 side corresponds to the third link movable-side connection shaft 51. The virtual lines (the broken lines) connecting between the first link movable-side connection shaft 47, the second link movable-side connection shaft 49, and the third link movable-side connection shaft 51 form a triangle as viewed in the vehicle width direction. The first link movable-side connection shaft 47, the second link movable-side connection shaft 49, and the third link movable-side connection shaft 51 are attached to the article storage box 13 so that the triangle defined by the virtual lines is located at the upper part of the article storage box 13.

In the "housed position" illustrated in FIG. 17A, the first link movable-side connection shaft 47 is located on the vehicle forward side of the first link fixed-side connection shaft 41. Similarly, in the "housed position", the second link movable-side connection shaft 49 is located on the vehicle forward side of the second link fixed-side connection shaft 43, and the third link movable-side connection shaft 51 is located on the vehicle forward side of the third link fixed-side connection shaft 45.

In the "intermediate position" illustrated in FIG. 17B, the first link movable-side connection shaft 47 is located below the first link fixed-side connection shaft 41. Similarly, in the "intermediate position", the second link movable-side connection shaft 49 is located below the second link fixed-side connection shaft 43, and the third link movable-side connection shaft 51 is located below the third link fixed-side connection shaft 45.

In the "drawn position" illustrated in FIG. 17C, the first link movable-side connection shaft 47 is located on the vehicle rearward side of the first link fixed-side connection shaft 41. Similarly, in the "drawn position", the second link movable-side connection shaft 49 is located on the vehicle rearward side of the second link fixed-side connection shaft 43, and the third link movable-side connection shaft 51 is located on the vehicle rearward side of the third link fixed-side connection shaft 45.

In the link mechanism having the configuration described above, the third link 39 serves as the driving link, and the first link 35 and the second link 37 each serve as the driven link during the movement of the article storage box 13 in association with the rotation of the first link 35, the second link 37, and the third link 39. The article storage box 13 is then rotated to draw the downward arc as viewed on the lateral side so as to be moved from the "housed position" illustrated in FIG. 17A via the "intermediate position" illustrated in FIG. 17B located on the lower and rear sides of the "housed position" to the "drawn position" illustrated in FIG. 17C located on the upper and rear sides of the "intermediate position".

The first link movable-side connection shaft 47, the second link movable-side connection shaft 49, and the third link movable-side connection shaft 51 are also rotated to be moved to draw the downward arc as viewed on the lateral side in association with the rotational movement of the article storage box 13. For example, at the "intermediate position" illustrated in FIG. 17B and FIG. 18, the first link movable-side connection shaft 47, the second link movable-side connection shaft 49, and the third link movable-side connection shaft 51 are located on the lowermost side. At the "drawn position" illustrated in FIG. 17C and FIG. 19, the first link movable-side connection shaft 47, the second link movable-side connection shaft 49, and the third link movable-side connection shaft 51 are located on the vehicle rearward side.

In the present embodiment, the region of the housing side wall 17 on the vehicle forward side corresponding to the movable region of the three links 35, 37, and 39 is extended downward. In addition, the three links 35, 37, and 39 each have an elliptic shape longer in the shaft-connecting direction connecting the respective connection shafts. The three links 35, 37, and 39 are attached to be located at the respective upper parts of the housing unit 15 and the article storage box 13.

Figure 18:
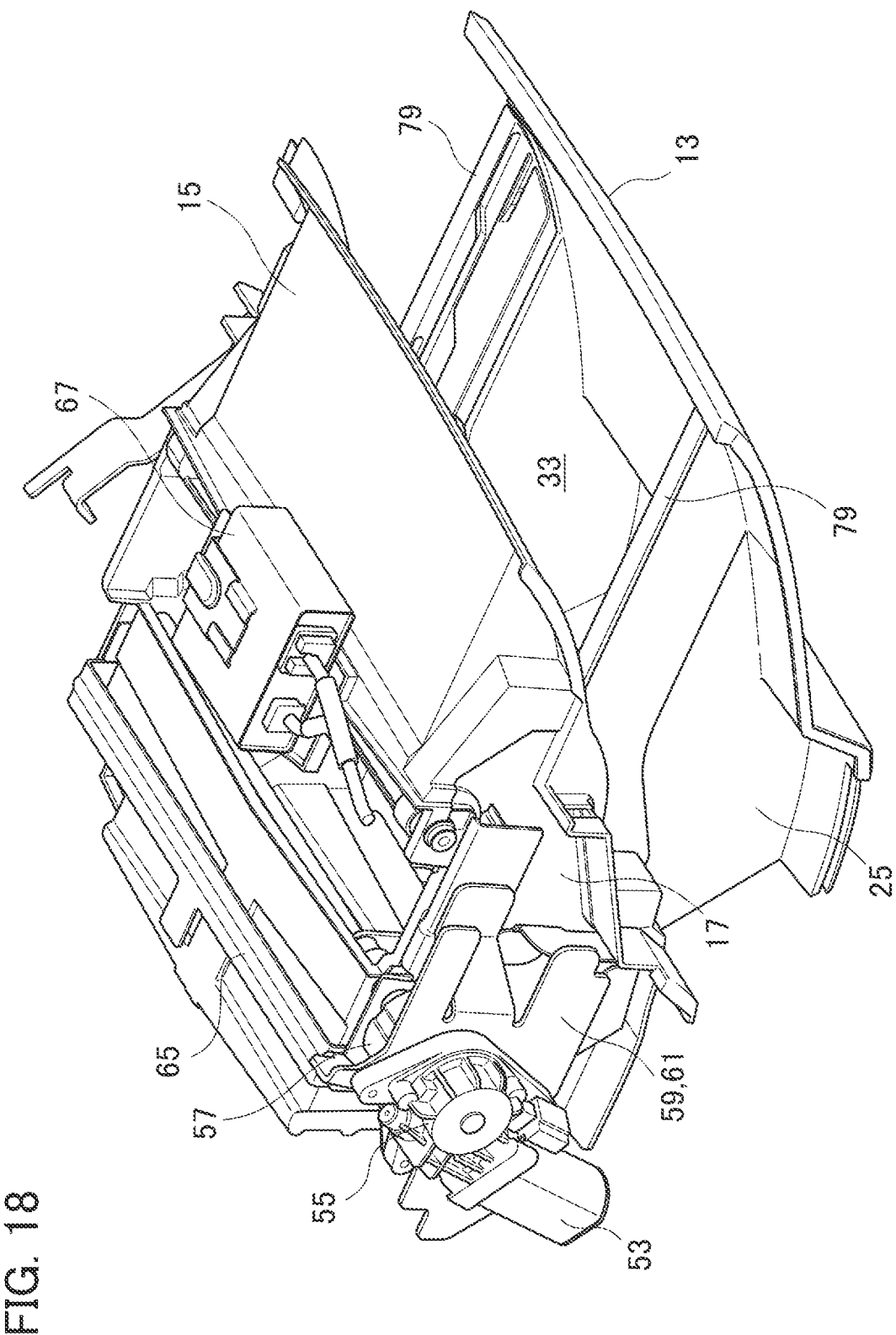
FIG. 18 is a perspective view when the article storage box according to the second embodiment is shifted to the intermediate position.
Figure 19:
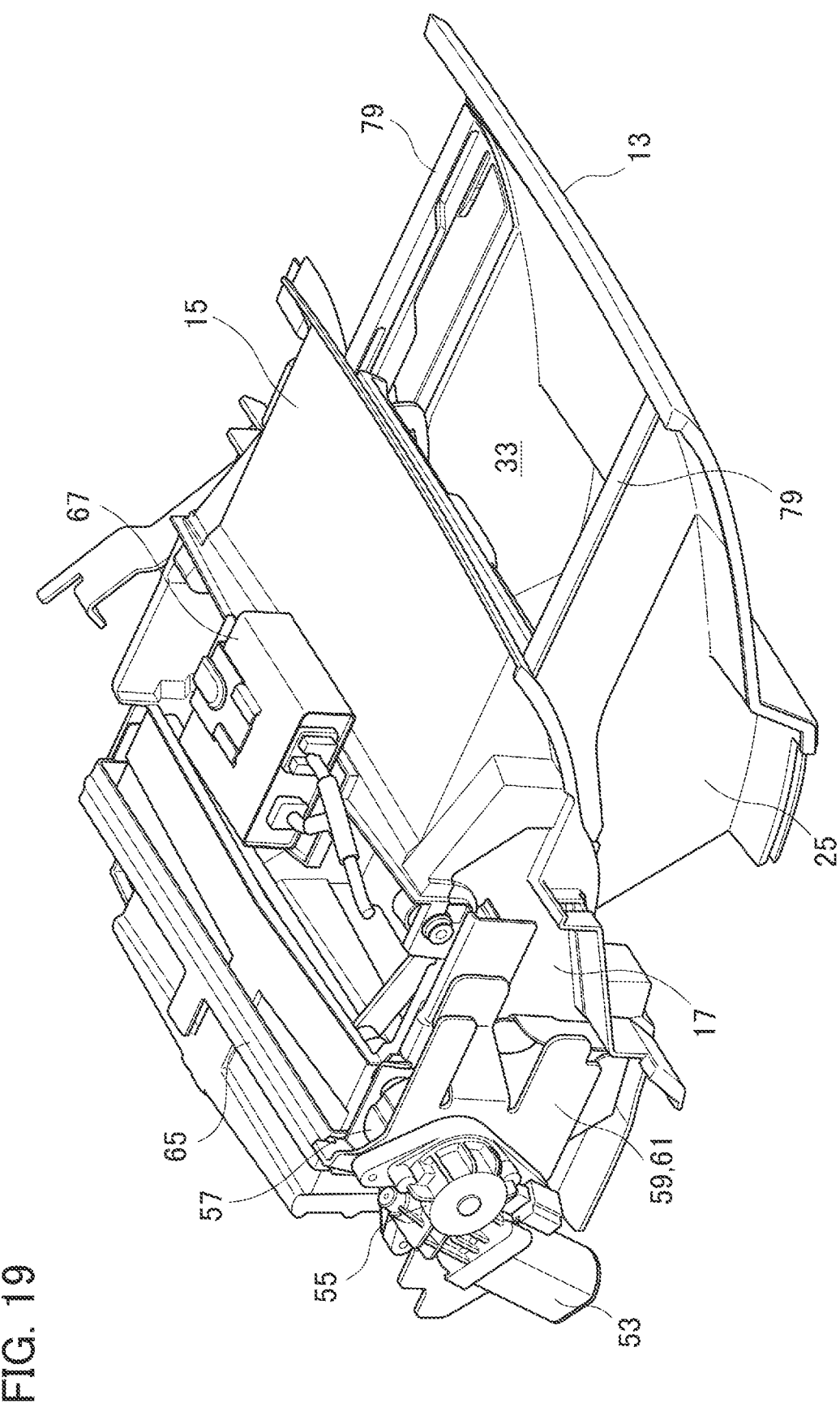
FIG. 19 is a perspective view when the article storage box according to the second embodiment is shifted to the drawn position from the intermediate position illustrated in FIG. 18.

The first link movable-side connection shaft 47, the second link movable-side connection shaft 49, and the third link movable-side connection shaft 51 in this structure are thus led to be located over the curved edge 17c of the housing side wall 17 at the "intermediate position" illustrated in FIG. 17B and FIG. 18. The first link movable-side connection shaft 47, the second link movable-side connection shaft 49, and the third link movable-side connection shaft 51 in this structure are also led to be located over the curved edge 17c of the housing side wall 17 at the "drawn position" illustrated in FIG. 17C and FIG. 19.

The first link movable-side connection shaft 47, the second link movable-side connection shaft 49, and the third link movable-side connection shaft 51 are constantly located over the curved edge 17c of the housing side wall 17 when the article storage box 13 is not only located at the "intermediately position" and the "drawn position" but also moved along the entire region between the "housed position" and the "drawn position" through the "intermediate position". The first link movable-side connection shaft 47, the second link movable-side connection shaft 49, the third link movable-side connection shaft 51, and the three links 35, 37, and 39 are thus hidden by the housing side wall 17 as viewed in the vehicle width direction along the entire region in which the article storage box 13 is moved from the "housed position" to the "drawn position" through the "intermediate position".

Figure 20:
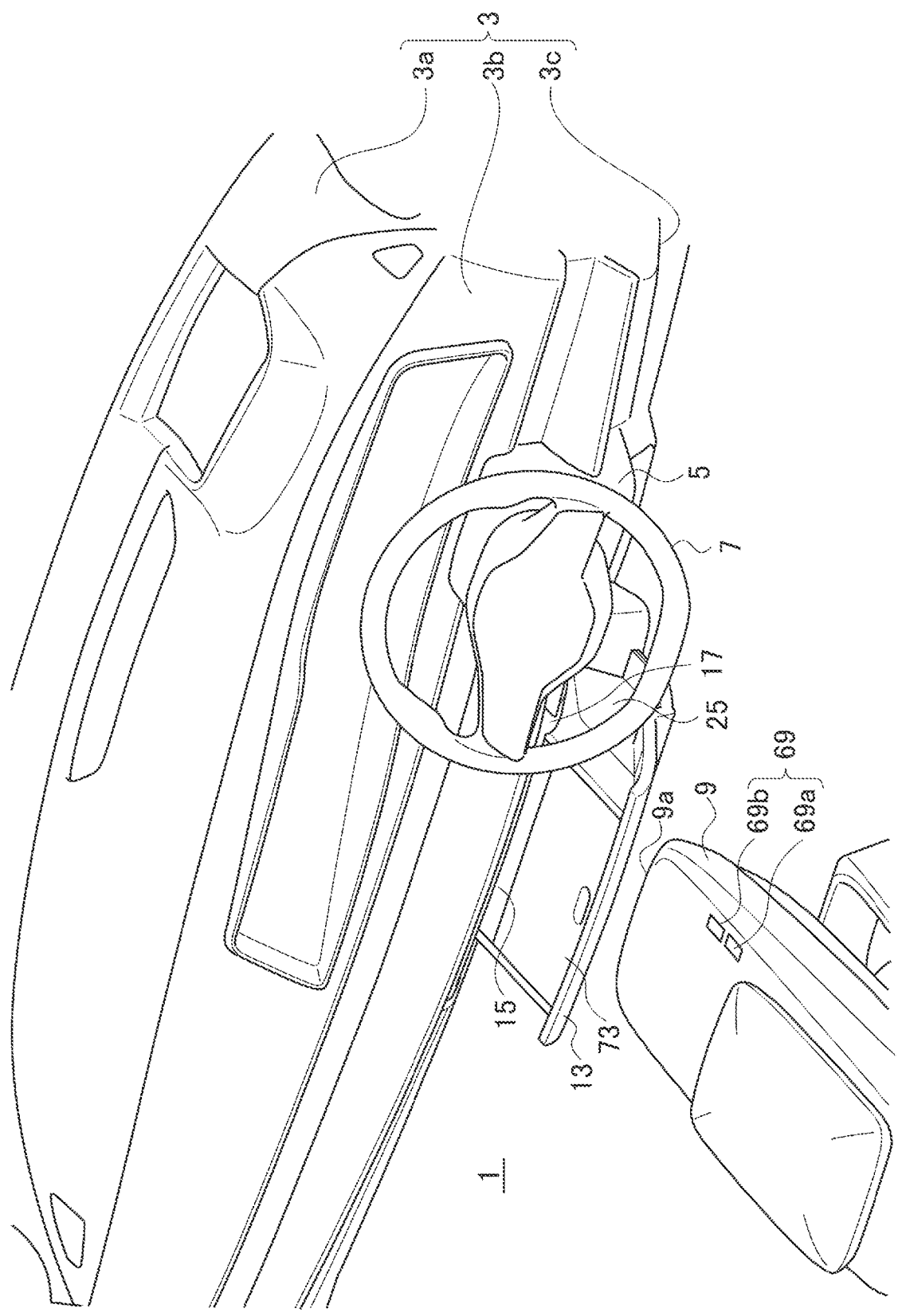
FIG. 20 is a perspective view illustrating the compartment of the vehicle in the state in which the article storage box according to the second embodiment is located at the intermediate position.
Figure 21:
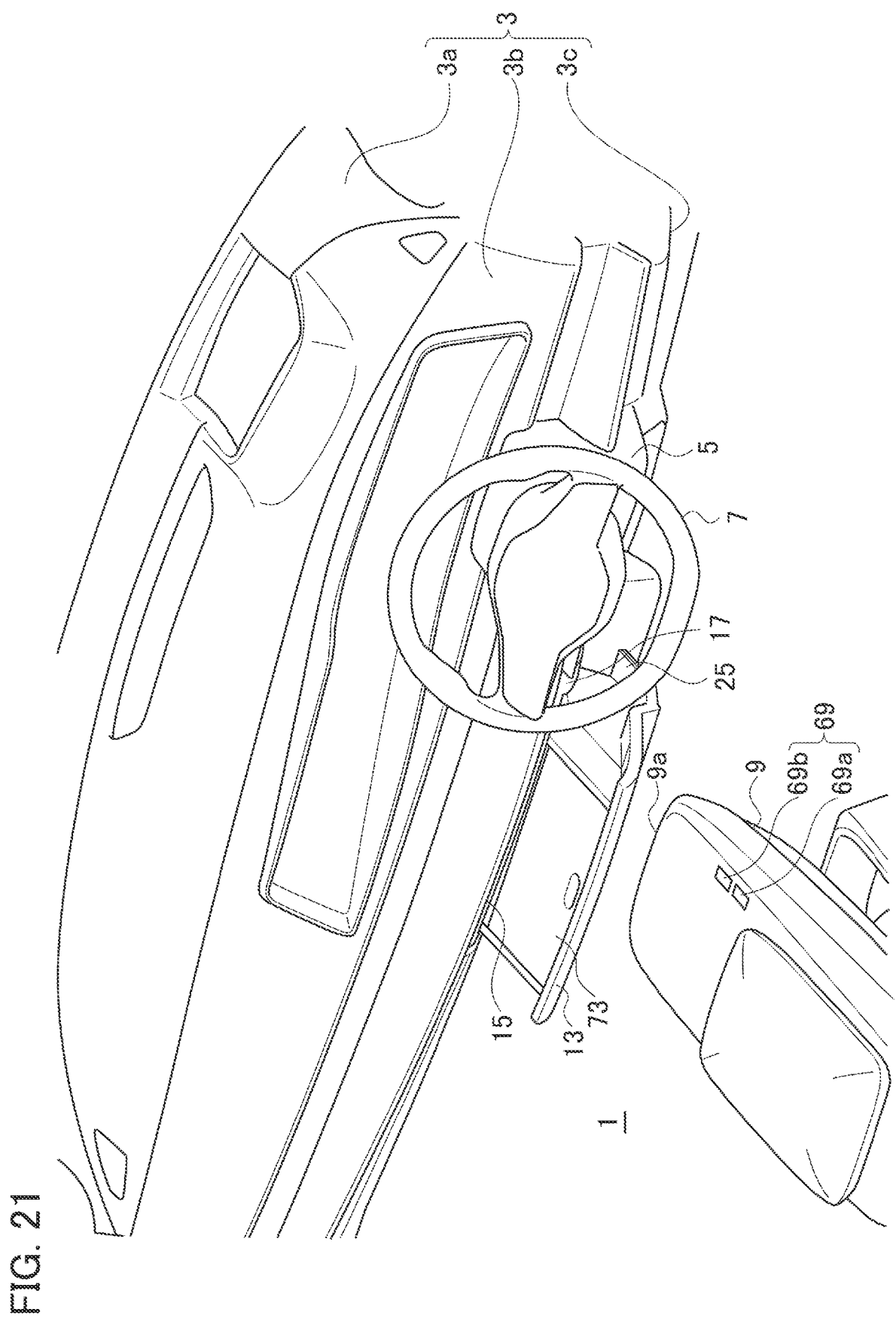
FIG. 21 is a perspective view illustrating the compartment of the vehicle in the state in which the article storage box according to the second embodiment is located at the drawn position.

According to the present embodiment as described above, the three connection parts of the three links 35, 37, and 39 on the article storage unit 13 side and the three links 35, 37, and 39 are covered by the housing side wall 17 regardless of the moved positions of the three links 35, 37, and 39. This structure can avoid the exposure of the three links 35, 37, and 39 toward the vehicle compartment regardless of the position at which the article storage box 13 is located such as the "intermediate position" or the "drawn position", as illustrated in FIG. 20 and FIG. 21. The present embodiment thus can prevent objects present in the vehicle compartment from being caught between the three links 35, 37, and 39.

The structure for hiding the three links 35, 37, and 39 by the housing side wall 17 can be implemented by one of the means of: (1) extending the housing side wall 17 downward, (2) regulating the positions of the three connection parts of the three links 35, 37, and 39 on the article storage box 13 side, and (3) adjusting the length (the inter-shaft distance) and the shape of the respective arms of the three links 35, 37, and 39, or by the combination of these means, for example.

While the present invention has been described above with reference to the respective embodiments, it should be understood that the explanations in the respective embodiments are made for illustration purposes for facilitating the understanding of the present invention, and the present invention is not intended to be limited to the embodiments described above. It should also be understood that the technical scope of the present invention is not intended to be limited to the specific technical aspects disclosed above in the respective embodiments but includes various modifications, changes, and alternative techniques easily derived therefrom.

For example, while the respective embodiments are illustrated above with the case of using the electric-powered unit including the motor 53 when opening and closing the article storage box 13, the article storage box 13 may be opened and closed manually. In the case of using a manual opening/closing unit, the box lower wall 31 may be provided with a recess or a grip so as to allow the occupant to hold the article storage box 13 by the hand. In the manual unit, a mechanism is required to be provided for keeping the article storage unit 13 at the "housed position" and the "drawn position" instead of the motor 53. Providing a latch-lock mechanism capable of leading to a lock/antilock state can lead the article storage box 13 to be locked at the "housed position" and the "drawn position". The article storage box 13 can be kept at the "intermediate position" due to its empty weight.

REFERENCE SIGNS LIST

3 INSTRUMENT PANEL
13 ARTICLE STORAGE BOX (ARTICLE STORAGE UNIT)
15 HOUSING UNIT
33a OPENING OF ARTICLE STORAGE BOX (ARTICLE INLET/OUTLET)
35 FIRST LINK
37 SECOND LINK
39 THIRD LINK
41 FIRST LINK FIXED-SIDE CONNECTION SHAFT (CONNECTION PART TOWARD HOUSING UNIT)
43 SECOND LINK FIXED-SIDE CONNECTION SHAFT (CONNECTION PART TOWARD HOUSING UNIT)
45 THIRD LINK FIXED-SIDE CONNECTION SHAFT (CONNECTION PART TOWARD HOUSING UNIT)
47 FIRST LINK MOVABLE-SIDE CONNECTION SHAFT (CONNECTION PART TOWARD ARTICLE STORAGE UNIT)
49 SECOND LINK MOVABLE-SIDE CONNECTION SHAFT (CONNECTION PART TOWARD ARTICLE STORAGE UNIT)
51 THIRD LINK MOVABLE-SIDE CONNECTION SHAFT
25 (CONNECTION PART TOWARD ARTICLE STORAGE UNIT)
53 MOTOR (DRIVE UNIT)
67 ECU (CONTROL UNIT)
69 OPERATION SWITCH (OPERATION UNIT)
71 PARTITION PLATE (PARTITION MEMBER)
73 SLIDE TABLE

The invention claimed is:

1. A vehicle article storage structure comprising:
an article storage unit provided with an article inlet/outlet on an upper side for getting an article in and out;
a housing unit provided on a lower side of an instrument panel to house the article storage unit; and
at least one link configured to movably support the article storage unit along a range from a housed position at which the article storage unit is housed in the housing unit to a drawn position at which the article storage unit is drawn in a vehicle compartment rearward direction from the housed position via an intermediate position at which the article storage unit is located between the housed position and the drawn position, the intermediate position being located below the housed position and the drawn position,
wherein the at least one link comprises a plurality of links,
wherein each link of the plurality of links includes a connection part toward the article storage unit and a connection part toward the housing unit,
wherein, for each link, the connection part toward the article storage unit is located on a vehicle forward side of a connection part of a corresponding link toward the housing unit at the housed position, is located on a vehicle rearward side of the connection part of the corresponding link toward the housing unit at the drawn position, and is located below the connection part of the corresponding link toward the housing unit at the intermediate position, and
wherein a partition member is arranged at a link between the connection part toward the article storage unit and the connection part toward the housing unit so as to partition the article storage unit to define the vehicle forward side and the vehicle rearward side of the article storage unit at an upper position of the article storage unit on the vehicle forward side when located at the intermediate position.

2. The vehicle article storage structure according to claim 1, further comprising a drive unit configured to rotate and drive the at least one link so as to move the article storage unit between the housed position and the drawn position, and an operation unit configured to stop a driving state of the drive unit at an optional rotating position of the at least one link.

3. The vehicle article storage structure according to claim 1, wherein:
a number of the links to be provided is three; and
a virtual line connecting the three connection parts of the three links toward the housing unit makes a triangle as viewed in a vehicle width direction, and a virtual line connecting the three connection parts of the three links toward the article storage unit makes a triangle as viewed in the vehicle width direction.

4. The vehicle article storage structure according to claim 1, wherein the article inlet/outlet of the article storage unit is provided with a slide table movable in a vehicle front-rear direction.

5. The vehicle article storage structure according to claim 4, wherein a surface of the slide table has a property of preventing the article from slipping on the surface.

6. The vehicle article storage structure according to claim 1, further comprising a drive unit configured to rotate and drive the at least one link so as to move the article storage unit between the housed position and the drawn position, and a control unit configured to control the drive unit in a state in which an ignition switch of a vehicle is in an OFF state and an accessory switch is in an ON state.

7. The vehicle article storage structure according to claim 1, wherein:
the housing unit includes a pair of housing side walls located on both sides in a vehicle width direction;
the article storage unit is located between the pair of housing side walls; and
the connection parts of the respective links toward the article storage unit are hidden by the housing side walls as viewed in the vehicle width direction at the intermediate position and the drawn position.

8. The vehicle article storage structure according to claim 3, wherein the link at which the partition member is arranged is the link of the three links located on an uppermost side.

9. The vehicle article storage structure according to claim 7, wherein the respective links are attached to an upper part of the article storage unit.

* * * * *